(12) United States Patent
Muralidhar et al.

(10) Patent No.: US 12,518,222 B2
(45) Date of Patent: Jan. 6, 2026

(54) SYSTEMS AND METHODS FOR MACHINE LEARNING OPTIMIZATION OF SEARCH QUERIES AND RESPONSE PARAMETERS

(71) Applicant: Expedia, Inc., Seattle, WA (US)

(72) Inventors: Anirudh Kamalapuram Muralidhar, Seattle, WA (US); Andrew Charles Reuben, Seattle, WA (US); Hitesh Saai Mananchery Panneerselvam, Seattle, WA (US)

(73) Assignee: Expedia, Inc., Seattle, WA (US)

( * ) Notice: Subject to any disclaimer, the term of this patent is extended or adjusted under 35 U.S.C. 154(b) by 0 days.

(21) Appl. No.: 18/504,942

(22) Filed: Nov. 8, 2023

(65) Prior Publication Data

US 2025/0148380 A1    May 8, 2025

(51) Int. Cl.
*G06Q 10/02* (2012.01)
*G06F 16/9538* (2019.01)

(52) U.S. Cl.
CPC ....... *G06Q 10/025* (2013.01); *G06F 16/9538* (2019.01)

(58) Field of Classification Search
CPC .......................... G06Q 10/025; G06F 16/9538
USPC .......................................................... 705/6
See application file for complete search history.

(56) References Cited

U.S. PATENT DOCUMENTS

| 10,540,965 | B2 | 1/2020 | Gandrabur et al. |
| 10,977,312 | B2 | 4/2021 | Wedum et al. |
| 2009/0157664 | A1 | 6/2009 | Wen |
| 2014/0114915 | A1 | 4/2014 | Zhang et al. |
| 2016/0171395 | A1* | 6/2016 | Lippow ................ G06Q 10/025 705/6 |
| 2017/0343368 | A1* | 11/2017 | Rangan ................. H04W 4/029 |

OTHER PUBLICATIONS

"Personalized Trip Recommendation with Multiple Constraints by Mining User Check-in Behaviors" Published by ACM digital Library (Year: 2012).*
International Search Report and Written Opinion dated Nov. 25, 2024, for PCT/US2024/054952.

* cited by examiner

*Primary Examiner* — Zeina Elchanti
(74) *Attorney, Agent, or Firm* — Foley & Lardner LLP

(57) ABSTRACT

A system includes at least one processing circuit including at least one memory and one or more processors configured to: obtain, via a user interface, a non-bounded query relating to a travel trip, the non-bounded query excluding at least one parameter associated with the travel trip; identify, via a first machine learning model, the at least one excluded parameter based on the non-bounded query; identify, via a second machine learning model and from among a first set of travel results that match the non-bounded query and the excluded parameter, a second set of the travel results that meet a presentation threshold of customer popularity based on at least one of a location selected by one or more users or a time selected by the one or more users; and present, via the user interface, one or more travel results of the second set, and the presentation threshold.

20 Claims, 12 Drawing Sheets

400C

Weekend beach trips to California — 414  402

| Traveling From | Adults | Non Stop Flights | Trip Type | Date search range | Trip days |
|---|---|---|---|---|---|
| SEA ×▼ | 1 ×▼ | 0 ×▼ | R ×▼ | 08-05 → 08-31 | 2 ×▼ |

SEARCH 430

410

| Departure | Arrival | Departure date | Return date | Departure tim | Arrival time | Duration | Num stops | Price | Seats availab |
|---|---|---|---|---|---|---|---|---|---|
| SEA | LAX | 08-20 | 08-22 | 8-20 9:20 PM | 8-20 11:59 PM | 2839M | 0 | 136 | 7 |
| SEA | ONT | 08-27 | 08-29 | 8-27 7:57 PM | 8-27 10:28 PM | 2831M | 0 | 136 | 7 |
| SEA | LAX | 08-27 | 08-29 | 8-27 12 PM | 8-27 2:52 PM | 2852M | 0 | 136 | 7 |
| SEA | ONT | 08-20 | 08-22 | 8-20 7:20 PM | 8-20 9:47 PM | 2827M | 0 | 157 | 7 |
| SEA | LAX | 08-13 | 08-15 | 8-13 9:30 PM | 8-14 12:19 PM | 2849M | 0 | 216 | 7 |
| SEA | LAX | 08-06 | 08-08 | 8-6 7:30 PM | 8-6 10:19 PM | 2849M | 0 | 236 | 7 |
| SEA | ONT | 08-13 | 08-15 | 8-13 9:30 PM | 8-13 10:33 PM | 2834M | 0 | 236 | 9 |
| SEA | SAN | 08-27 | 08-29 | 8-27 7:19 PM | 8-27 10:06 PM | 2847M | 0 | 236 | 7 |
| SEA | ONT | 08-06 | 08-08 | 8-6 3:57 PM | 8-6 6:31 PM | 2834M | 0 | 266 | 7 |
| SEA | SAN | 08-13 | 08-15 | 8-13 6:55 PM | 8-13 9:45 PM | 2850M | 0 | 327 | 7 |
| SEA | SAN | 08-06 | 08-08 | 8-6 7:55 PM | 8-6 10:45 PM | 2850M | 0 | 405 | 3 |

SYSTEMS AND METHODS FOR MACHINE LEARNING OPTIMIZATION OF SEARCH QUERIES AND RESPONSE PARAMETERS

TECHNICAL FIELD

The present implementations relate generally to search engines and, more particularly, to systems and methods for machine learning optimization of search queries and response parameters.

BACKGROUND

Consumers increasingly demand intuitive answers to questions in various subject matter areas, based on increasingly broad questions. However, conventional search systems lack an ability to provide accurate responses to generalized queries in specific subject matter areas.

SUMMARY

At least one aspect is directed to a system. The system includes at least one processing circuit including at least one memory and one or more processors. The one or more processors are configured to: obtain, via a user interface, a non-bounded query relating to a travel trip, the non-bounded query excluding at least one parameter associated with the travel trip; identify, via a first machine learning model, the at least one excluded parameter based on the non-bounded query; identify, via a second machine learning model and from among a first set of travel results that match the non-bounded query and the excluded parameter, a second set of the travel results that meet a presentation threshold of customer popularity based on at least one of a location selected by one or more users or a time selected by the one or more users; and present, via the user interface, one or more travel results of the second set, and the presentation threshold.

At least one other aspect is directed to a method. The method includes: obtaining, via a user interface, a non-bounded query relating to a travel trip, the non-bounded query excluding at least one parameter associated with the travel trip; identifying, via a first machine learning model, the at least one excluded parameter based on the non-bounded query; identifying, via a second machine learning model and from among a first set of travel results that match the non-bounded query and the excluded parameter, a second set of the travel results that meet a presentation threshold of customer popularity based on at least one of a location selected by one or more users or a time selected by the one or more users; and presenting, via the user interface, one or more travel results of the second set, and presentation threshold.

At least one further aspect is directed to a non-transitory computer-readable medium including instructions stored therein that, when executed by one or more processors, cause the one or more processors to perform operations including: obtaining, via a user interface, a non-bounded query relating to a travel trip, the non-bounded query excluding at least one parameter associated with the travel trip; identifying, via a first machine learning model, the at least one excluded parameter based on the non-bounded query; identifying, via a second machine learning model and from among a first set of travel results that match the non-bounded query and the excluded parameter, a second set of the travel results that meet a presentation threshold of customer popularity based on at least one of a location selected by one or more users or a time selected by the one or more users; presenting, via user interface, one or more travel results of the second set, and the presentation threshold.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

The accompanying drawings are not intended to be drawn to scale. Like reference numbers and designations in the various drawings indicate like elements. For purposes of clarity, not every component may be labeled in every drawing. In the drawings:

FIG. 4C depicts a user device presenting a user interface including a response, according to an example embodiment.

DETAILED DESCRIPTION

Figure 1:
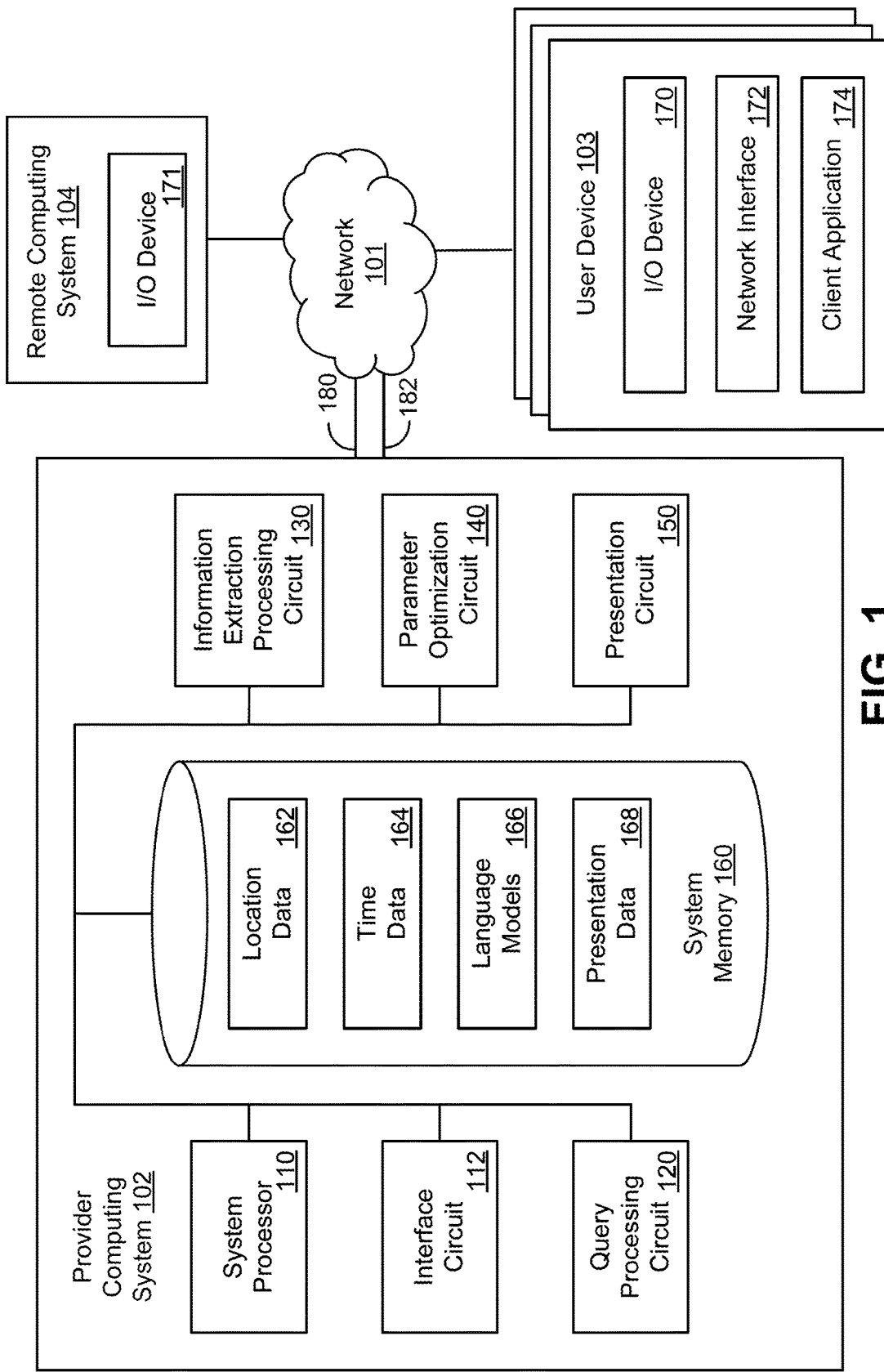
FIG. 1 depicts a computing system, according to an example embodiment.

Below are detailed descriptions of various concepts related to and implementations of techniques, approaches, methods, apparatuses, and systems for machine learning optimization of search queries and response parameters. The various concepts introduced above and discussed in detail below may be implemented in any of numerous ways, as the described concepts are not limited to any particular manner of implementation. Examples of specific implementations and applications are provided primarily for illustrative purposes.

Referring generally to the Figures, aspects and embodiments of the present disclosure relate to systems and methods that improves conventional computers and, specifically, electronic networked search processes. The systems and methods improve electronic searches (e.g., searches for content, such as destinations) by generating and providing intelligent content, such as travel recommendation(s), using various machine-learning methods. This disclosure relates at least to leveraging machine learning algorithms and devices to automate the optimization of various parameters, such as travel parameters or other domain/search parameters. As a result, an intelligent system capable of recommending personalized travel itineraries by employing sophisticated data analysis and predictive modeling is provided. As described herein, this machine learning approach for automated travel parameter optimization may enhance the travel experience by simplifying and optimizing the decision-making process for travelers. As a result, at least the systems, computer-readable media, and methods described herein may provide efficient and seamless travel planning/booking platform to enable a smooth or relatively smooth customer journey. The traditional manner of manually searching with different travel parameters can take time and effort. Searching for flights requires users to input specific parameters of interest such as origin, destination, travel dates, and others. This input method can be time-consuming. Additionally, traditional searching processes place the onus on users to have prior knowledge of available airports, travel dates, and potential destinations. The user is required to be specific in identifying the specific parameters, resulting in several searches to see what works best for the user. As a result, conventional approaches to travel-related searches, as an example (e.g., flight searches), often lead to suboptimal or overwhelming results, requiring users to invest significant effort in finding the most suitable travel-related experiences (e.g., flights) for their travel needs.

However, the machine learning techniques of this disclosure, provide a technical solution to improve the travel planning process. This is achieved via computational circuits directed to (i) input parameter entry and (ii) output result presentation. It should be noted that while the instant disclosure focuses on flight bookings, the principles of the automated approach for optimizing travel parameters can be applied beyond flight bookings, such as to lodging bookings and experience bookings (e.g., excursions). Further, it should be noted that though this disclosure is described with non-limiting examples including travel parameters or a travel domain, this disclosure is not limited to travel parameters or a travel domain. For example, systems and methods according to this disclosure can support search parameters of any one or more domains. The underlying principles of using machine learning algorithms, data analysis, and predictive modeling can be adapted to various other aspects of the travel industry. For example, the instant disclosure may be extended to optimize hotel bookings, package recommendations, or even broader travel planning platforms. Regarding input parameter entry, this disclosure describes a technical solution for simplifying the user input process to require minimal information in a non-conventional manner. Users can provide concise non-bounded inputs such as 'Weekend flights to California,' 'Flights to NYC,' or 'Flights to Chicago on July 1st,' along with their origin. Non-bounded meaning that at least one parameter that may define or affect the search criteria is missing. With the 'Weekend flights to California,' multiple parameters that typically are required to perform the search are missing, such as what day does the "weekend" start on (i.e., what is the precise departure date and preferred departure time), when is the precise return date and time, is there a preferred airline, and so on, which makes this general query be "non-bounded." By leveraging machine learning, the instant disclosure extracts meaningful information from these inputs (the non-bounded query) to identify the best or most optimal flight destinations and travel dates. Regarding output result presentation, the instant disclosure utilizes this extracted information to generate relevant and personalized travel results/content, such as flight search results. For example, systems and methods according to this disclosure supports making one or more searches, and selecting one or more best offers from each of the searches. By streamlining the output presentation, the instant disclosure may enhance the overall user experience and facilitate efficient booking decisions via an improved computational circuit or circuits and an improved user interface that can be coupled with the improved computational circuit or circuits.

As described herein, this technical solution is directed at least to executing a search engine with at least one quantitative input for a given search domain based on at least one qualitative input. The technical solution can receive the at least one qualitative input corresponding to one or more data sets with respect to a data domain, and can generate one or more quantitative parameters to execute a search of the data domain. For example, the technical solution can be directed to a travel domain including both time and location data elements. The technical solution can obtain an input directed to qualitative time and geographic input, and can generate quantitative or discrete parameters based on the qualitative input. For example, a user interface according to this disclosure can obtain an input including "weekend" and "California" and can generate parameters corresponding to discrete dates, times, geolocations, addresses, landmarks, airports, or any combination thereof. The technical solution can provide at least a technical improvement to provide a user interface to indicate quantitative domain-specific data at given user interface presentations that are in response to the qualitative input received at the user interface. For example, the user interface can present an arrangement of one or more data elements corresponding to trips having given durations across given date or time ranges, or trips having given locations as origins, destinations, or waypoints.

This disclosure utilizes natural language processing and machine learning techniques to extract valuable or potentially valuable information from user queries, enabling personalized travel itineraries. By leveraging machine learning algorithms, sophisticated data analysis, and predictive modeling, the systems, methods, and computer-readable described herein may improve the way travel parameters are optimized. As described herein, improving the user experience may lead to a simplified input parameter entry and a refined output result presentation thereby ensuring or attempting to ensure a seamless or relatively seamless and efficient journey for travelers. The systems, methods, and computer-readable described herein are configured to handle user inputs and extract relevant information by employing natural language processing and information retrieval techniques. The systems, methods, and computer-readable described herein generate and provide relevant and tailored travel content, such as flight search results, by integrating historical travel data, real-time information feeds, and user preferences. The optimization of search combinations, retrieval of flight offers through an application programming interface ("API") (e.g., a flight API configured to obtain one or more travel objects) and the ranking of offers using machine learning models further enhances the decision-making process. As a specific example, the systems, methods, and computer-readable described herein may process an input parameter, apply the optimization algorithms, and retrieve the most relevant and attractive flight options. For example, the optimization layer can provide input to result in returning all offers for given search parameters. A system applies one or more ranking models to the returned offers to provide to the user device top flights offers. Furthermore, the systems, methods, and computer-readable described herein may leverage cloud infrastructure to provide scalability and efficiency in handling many user queries. By providing a user friendly, intelligent, and efficient solution, users such as travelers can make informed decisions and achieve a more satisfying and seamless travel planning experience. Overall, the systems, methods, and computer-readable described herein provide a user-friendly, intelligent, and efficient technical solution for travel parameter optimization and presentation via machine learning.

Aspects of this technical solution are directed to integration of a plurality of artificial intelligence (AI) circuits to provide at least one quantitative response to at least one qualitative input at a user interface. For example, the technical solution can include a first AI circuit corresponding to a natural language processor (NLP), and a second AI circuit corresponding to a machine learning (ML) system. The NLP can receive the at least one qualitative input at the user interface (e.g., a textual input including a non-bounded query, such as "Weekend trips to Napa Valley"), and can identify one or more portions of the qualitative input as corresponding to given domain-specific input. The NLP can identify one or more locations or time periods specific to a domain that includes location and time data. The NLP can be structured, augmented or modified according to this technical solution to achieve at least a technical improvement to detect natural language sequences indicative of qualitative input corresponding to given domain-specific input. The ML circuit can generate one or more models indicative of selection frequency according to one or more parameters of a domain. For example, the ML circuit can generate a model indicative of most popular predicted dates for a trip according to a qualitative data descriptive of a date range. Thus, the technical solution can provide at least a technical improvement to generate predictive output indicative of quantitative parameters based on at least one qualitative user input. Aspects of this technical solution are directed to a user interface to present one or more indications in one or more arrangements corresponding to one or more of the domains, the qualitative input and the quantitative output, as discussed herein. For example, the user interface can present one or more results of a search in a domain relative to one or more indications of parameters identified by the ML circuit from the at least one input by the NLP. For example, the user interface can display one or more durations of trips, and their associated itineraries, according to trip durations having a selection frequency satisfying one or more thresholds or data of the ML circuit. Thus, this technical solution can provide at least a technical improvement of a user interface configured to accurately and effectively present output based on one or more AI circuits with respect to a given domain. These and other features and benefits are described more herein below.

Based on the foregoing, referring now to FIG. 1, a computing system is shown, according to an example embodiment. As illustrated by way of example in FIG. 1, a computing system 100 can include at least a network 101, a provider computing system 102, a user device 103, a remote computing system 104, a user device communication channel 180, and a remote system communication channel 182.

The network 101 can include any type or form of network. The geographical scope of the network 101 can vary widely and the network 101 can include a body area network (BAN), a personal area network (PAN), a local-area network (LAN), e.g., Intranet, a metropolitan area network (MAN), a wide area network (WAN), or the Internet. The topology of the network 101 can be of any form and can include, e.g., any of the following: point-to-point, bus, star, ring, mesh, or tree. The network 101 can include an overlay network which is virtual and sits on top of one or more layers of other networks 101. The network 101 can be of any such network topology as known to those ordinarily skilled in the art capable of supporting the operations described herein. The network 101 can utilize different techniques and layers or stacks of protocols, including, e.g., the Ethernet protocol, the Internet protocol suite (TCP/IP), the ATM (Asynchronous Transfer Mode) technique, the SONET (Synchronous Optical Networking) protocol, or the SD (Synchronous Digital Hierarchy) protocol. The 'TCP/IP Internet protocol suite can include application layer, transport layer, Internet layer (including, e.g., IPv6), or the link layer. The network 101 can include a type of a broadcast network, a telecommunications network, a data communication network, or a computer network.

The provider computing system 102 may be operated by, owned by, controlled by, and/or otherwise associated with a provider institution. The provider institution may be a provider of various goods and/or services. In the example depicted, the provider institution is a travel experience provider. The provider institution may therefore facilitate and enable travel bookings, such as flight bookings, lodging bookings, excursion bookings, and so on. The provider of these services may, in turn, be a different entity relative to the provider institution (e.g., the lodging booking of Lodge ABC may be enabled via the provider institution and provider institution computing system 102 but the provider institution is a third-party relative to Lodge ABC). In other embodiments, the provider institution itself may provide various services as well (e.g., operate a lodging location in addition to enabling bookings at the lodging location and, perhaps, other lodging locations).

The provider computing system 102 can include a physical computer system operatively coupled or able to be coupled with one or more components of the computing system 100, either directly or directly through an intermediate computing device or system. The provider computing system 102 can include a virtual computing system, an operating system, and a communication bus to effect communication and processing. In the example shown, the provider computing system 102 is structured as one or more server-based systems. The provider computing system 102 can include a system processor 110, an interface circuit 112, a query processing circuit 120, an information extraction processing circuit 130, a parameter optimization circuit 140, a presentation circuit 150, and a system memory 160.

The system processor 110 can execute one or more instructions associated with the provider computing system 102. The system processor 110 can include, but is not limited to, at least one microcontroller unit (MCU), microprocessor unit (MPU), central processing unit (CPU), graphics processing unit (GPU), physics processing unit (PPU), embedded controller (EC), or the like. The system processor 110 can include a memory operable to store or storing one or more instructions for operating components of the system processor 110 and operating components operably coupled to the system processor 110. Alternatively, or additionally, the one or more instructions may be stored by the system memory 160 and are retrievable and executable by the system processor 110. The one or more instructions can include one or more of firmware, software, hardware, operating systems, embedded operating systems. The system processor 110 or the provider computing system 102 generally can include one or more communication bus controller to effect communication between the system processor 110 and the other elements of the provider computing system 102.

The interface circuit 112 can link the provider computing system 102 with one or more of the networks 101, the user device 103, and the remote computing system 104, by one or more communication interfaces. A communication interface can include, for example, an API compatible with a given component of the provider computing system 102, the user device 103, or the remote computing system 104. The communication interface can provide a given communication protocol compatible with a given component of the provider computing system 102 and a given component of the user device 103 or the remote computing system 104. The interface circuit 112 can be compatible with given content objects, and can be compatible with given content delivery systems corresponding to given content objects, structures of data, types of data, or any combination thereof. For example, the interface circuit 112 can be compatible with transmission of data structured according to one or more domains as discussed herein. For example, the interface circuit 112 can be compatible with a virtual environment via a protocol compatible with latency and encryption corresponding to a virtual environment. For example, the provider computing system 102 can transmit, via the interface circuit 112, a request to obtain the first set of the travel results matching the non-bounded query. The system can receive, via the interface circuit, the first set of the travel results.

The query processing circuit 120 can analyze, parse, inspect, or otherwise process an input/prompt/query received from the user device 103. The query processing circuit 120 may be configured to receive a text input, voice input, image input, video input, or any combination thereof (e.g., query) from the user device 103. For example, the user device 103 can obtain an image or a link to an image, and transmit the image or the link to the image to the query processing circuit 120. The query processing circuit 120 then performs an image-to-text process to identify text associated with content of the image or metadata of the image. For example, the user device 103 may obtain a video input. The query processing circuit 120 may receive the video input and isolate the text associated with the video input to generate a travel parameter. As a specific example, the query processing circuit 120 receives an image of a beach, with metadata indication a geolocation in Santa Monica, CA. The query processing circuit 120 generates a "beach" parameter by the image-to-text process, and generates a "Santa Monica, CA" travel parameter based on the geolocation. The query processing circuit 120 may be configured to tokenize the text input into tokens (e.g., phrases, passages, individual words, sub-words, punctuation, etc.). The query processing circuit 120 may be configured to transform, convert, or otherwise encode each token generated for the text input into an encoded token. The encoded token may be encoded into a format (such as vector format, word embeddings, etc.) that is compatible with the presentation circuit 150 or one or more user interfaces corresponding to the presentation circuit 150, as described in greater detail herein. The query processing circuit 120 may tokenize the query and encode the tokens for applying to a neural network of the information extraction processing circuit 130. The query processing circuit 120 can detect a given structure or format of the input or the query and can generate a query having a given structure or format, based on the input.

The information extraction processing circuit 130 can generate one or more data sets based on one or more portions of a query. For example, the information extraction processing circuit 130 can receive an output of the query processing circuit 120 including one or more text objects corresponding to a query. An AI model corresponding to the information extraction processing circuit 130 can include an NLP as discussed herein. For example, a text object can include a tokenized string including part-of-speech tokens linked with corresponding substrings of the tokenized string. For example, a part-of-speech can correspond to a noun, verb, adjective, adverb, article, but is not limited thereto. For example, a text object can include a tokenized string including part-of-domain tokens linked with corresponding substrings of the tokenized string. For example, a part-of-domain can correspond to a data element, features or aspect of a predetermined domain. For example, a part-of-domain can correspond to a time period, a time, a date, a geolocation, an address, a landmark, a location code, or any combination thereof. For example, a location code can correspond to an airport code, or a train station code, but is not limited thereto. The information extraction processing circuit 130 can generate one or more parameters based on one or more data sets from the information extraction processing circuit 130. For example, the parameter optimization circuit 140 can generate parameters corresponding to a domain corresponding to a query. For example, a query can correspond to a request for travel data, where the travel data can include parameters corresponding to locations and times as discussed herein. Thus, the information extraction processing circuit 130 can provide a technical improvement at least to generating parameters according to an AI model that is configured to extract semantic features from a query according to a domain.

The parameter optimization circuit 140 can generate one or more predictions or determinations corresponding to one or more parameters received from the information extraction processing circuit 130. As described herein, the "parameters" may be travel parameters and, as such, correspond to a duration of stay, an arriving and/or departing airport, number of travelers for a trip, cabin class (e.g., first, business, premium economy, economy, basic economy), baggage information (e.g., baggage check or carryon), and other aspects that define the trip. The parameter optimization circuit 140 can generate predictions according to an ML circuit configured to predict time periods and locations satisfying one or more thresholds. For example, the parameter optimization circuit 140 can generate predictions to identify date ranges and destination airports after a predetermined date, that correspond to date ranges and destination airports most frequently selected before a predetermined date. For example, a predetermined date can correspond to a current date at receipt of the query at the user device 103. The parameter optimization circuit 140 can identify one or more output parameters indicative of predetermined optimal date ranges after the predetermined date and based on one or more location parameters or time parameters from the information extraction processing circuit 130. For example, the parameter optimization circuit 140 can generate one or more future date ranges or time periods that satisfy the parameters generated by the information extraction processing circuit 130, the data corresponding to those parameters, and the query for those data. As discussed herein, an optimized parameter includes a parameter having a value that most closely matches or exactly matches a criterion of selection. For example, an optimized parameter is a highest value among a plurality of values, where the criterion of selection is a relative or absolute maximum of the values. Examples of optimized values are discussed herein with respect to peak values, but are not limited thereto. As discussed herein, optimization includes identification or selection of an optimized object.

The presentation circuit 150 can generate, determine, and/or provide one or more outputs at least partially corresponding to a response by the output from the parameter optimization circuit 140. For example, the presentation circuit 150 can generate or transform a structure of data corresponding to a response to a given user interface or a given data. For example, the presentation circuit 150 can select a user interface corresponding to a structure of data corresponding the user interface and can transmit the response having the given data structure to one or more user interfaces configured to present the response according to the structure. For example, the presentation circuit 150 can be configured to provide responses in various formats, including for example text outputs, table outputs, visual or graphical outputs, and so forth, or to instruct or cause a user interface to provide responses in various formats. The presentation circuit 150 may be configured to generate the responses at one or more of the user devices 103 or the remote computing system 104.

The system memory 160 can store data associated with the computing system 100. The system memory 160 can include one or more hardware memory devices to store binary data, digital data, or the like. The system memory 160 can include one or more electrical components, electronic components, programmable electronic components, reprogrammable electronic components, integrated circuits, semiconductor devices, flip flops, arithmetic units, or the like. The system memory 160 can include at least one of a non-volatile memory device, a solid-state memory device, a flash memory device, or a NAND memory device. The system memory 160 can include one or more addressable memory regions disposed on one or more physical memory arrays. A physical memory array can include a NAND gate array disposed on, for example, at least one of a given semiconductor device, integrated circuit device, and printed circuit board device.

The system memory 160 can include a location data storage 162, a time data storage 164, a language model storage 166, and a presentation data storage 168. The location data storage 162 can store one or more data elements corresponding to indications of given locations. For example, indications of given locations can correspond to identification of given text fragments that indicate given geographic regions, localities, areas, jurisdictions, or any combination thereof, but are not limited thereto. For example, the indications of given locations can link one or more text strings with one or more corresponding locations. For example, the indications of given locations can link one or more strings tokenized according to an NLP with one or more corresponding locations. The time data storage 164 can store one or more data elements corresponding to indications of given times. For example, times can correspond to timestamps, datestamps, or datetime stamps including both time and date, but are not limited thereto. For example, indications of given times can correspond to identification of given text fragments that indicate date ranges, time periods, times of year, times of the week, times of the month, seasons, or any combination thereof, but are not limited thereto. For example, the indications of given times can link one or more text strings with one or more corresponding times. For example, the indications of given times can link one or more strings tokenized according to an NLP with one or more corresponding times.

The language model storage 166 can store one or more models trained by the ML circuits. For example, the language model storage 166 can store models respectively configured to identify location and times according to a travel domain. For example, the language model storage 166 can store models respectively configured to identify parameters according to one or domains. The presentation data storage 168 can store one or more instructions to present one or more parameters, data, or indications corresponding thereto at a user interface. For example, the instructions to present can correspond to templates, rendering profiles, or any combination thereof. The instructions to present can configure a user interface to present indications according to parameters corresponding to a given domain. The instructions to present can configure a user interface to present indications according to data corresponding to a given query.

The user device(s) 103 is owned, operated, controlled, managed, and/or otherwise associated with a customer (e.g., a customer of the provider or traveler institution). In some embodiments, the user device 103 may be or may include, for example, a desktop or laptop computer (e.g., a tablet computer), a smartphone, a wearable device (e.g., a smartwatch), a personal digital assistant, and/or any other suitable computing device. In the example shown, the user device 103 is structured as a mobile computing device, namely a smartphone. The user device 103 is located remotely from the provider computing system 102. Multiple user devices 103 are shown to indicate that each user may own or be associated with multiple user devices 103.

The user device 103 includes one or more I/O devices 170, a network interface 172, and one or more client applications 174. While the term "I/O" is used, it should be understood that the I/O devices 170 may be input-only devices, output-only devices, and/or a combination of input and output devices. In some instances, the I/O devices 170 include various devices that provide perceptible outputs (such as display devices with display screens and/or light sources for visually-perceptible elements, an audio speaker for audible elements, and haptics or vibration devices for perceptible signaling via touch, etc.), that capture ambient sights and sounds (such as digital cameras, microphones, etc.), and/or that allow the customer to provide inputs (such as a touchscreen display, stylus, keyboard, force sensor for sensing pressure on a display screen, etc.). In some instances, the I/O devices 170 further include one or more user interfaces (devices or components that interface with the customer), which may include one or more biometric sensors (such as a fingerprint reader, a heart monitor that detects cardiovascular signals, face scanner, an iris scanner, etc.). For example, an I/O device is a display device. The display device can display at least one or more user interfaces and can include an electronic display. An electronic display can include, for example, a liquid crystal display (LCD), a light-emitting diode (LED) display, an organic light-emitting diode (OLED) display, or the like. The display device can receive, for example, capacitive or resistive touch input.

In the example shown, the user device 103 includes a provider institution client application (or "client application") 174. The provider institution client application 174 may be provided by and at least partly supported by the provider computing system 102. In this regard, the client application 174 may be coupled to the provider computing system 102 and may enable the customer to perform various customer activities (e.g., travel book, flight searching, etc.) and/or perform various transactions (e.g., purchasing flights, hotels, car rental, or other services, and redeeming benefits including cash rewards, accrual of membership points, etc.) associated with one or more customer accounts of the customer held at the provider associated with the provider computing system 102 (e.g., membership account opening and closing operations, account credit and points transfers, etc.). In the example shown, the provider institution client application 174 may be a mobile travel application that enables various travel and itinerary management functionalities provided and supported by the provider computing system 102. In some instances, the client application 174 provided by the provider computing system 102 may additionally be coupled to the network 101 (e.g., via one or more application programming interfaces (APIs), webhooks, and/or software development kits (SDKs)) to integrate one or more features or services provided by the third-party content system 105. In some instances, the client application 174 may be provided as a web-based feature or application.

The I/O device 170 can be presentable on a display device operatively coupled with or integrated with the user device 103. The I/O device 170 can output at least one or more user interface presentations via a display device and control fields. For example, a user interface can encompass a display device, an input device including a touch input device, an audio device to generate audio output, or any combination thereof. For example, the I/O device 170 can activate one or more of these components to output a graphical user interface (GUI) including one or more visual elements than can be selected by the touch input device or visually presented by the display device. The I/O device 170 can generate any physical phenomena detectable by human senses, including, but not limited to, one or more visual outputs, audio outputs, haptic outputs, or any combination thereof.

The remote computing system 104 is, in one example, a computing system located remotely from the provider computing system 102 and distinct from the user device 103. In this regard, the provider computing system 102 may be coupled to the remote computing system 104 and may enable the provider to obtain information (e.g., flight timings, airline seat availability, data, hotel room availability, car rental availability, etc.) associated with one or more customer accounts of the customer held at the provider associated with the provider computing system 102 In the example shown, the remote computing system 104 may be a server system operated by an airline, hotel, car rental agency, or other travel-related entity that is a third-party relative to the provider institution operating the provider computing system 102. The remote computing system 104 may store and provide various travel and itinerary data that can be made available to the provider computing system 102. In some instances, the remote computing system 104 may additionally be coupled to the network 101 (e.g., via one or more application programming interfaces (APIs), webhooks, and/or software development kits (SDKs)) to integrate one or more features or services provided by the third-party content system 105.

The remote computing system 104 is a cloud system, a server, a distributed remote system, or any combination thereof. For example, the remote computing system 104 can include an operating system to execute a virtual environment. The operating system can include hardware control instructions and program execution instructions. The operating system can include a high-level operating system, a server operating system, an embedded operating system, or a boot loader. The remote computing system 104 can include a I/O device 171. The I/O device 171 can correspond at least partially to one or more of structure and operation to the I/O device 170, and can be distinct from the I/O device 170.

One or more of the interface circuits 112, the query processing circuit 120, the information extraction processing circuit 130, the parameter optimization circuit 140, and the presentation circuit 150 can be independent circuits from the system processor 110, or can be integrated with the system processor 110 as various cores, dedicated processors, processing blocks, or any combination thereof.

The travel object storage is a storage block for one or more data elements including parameters corresponding to the travel domain. For example, the language model storage 166 can store models configured to identify location and times according to a travel domain. For example, the language model storage 166 can store models configured to identify parameters according to one or more domains. The travel object storage is discussed by way of example as directed to travel objects corresponding to the travel domain, but is not limited thereto. The remote computing system 104 can include storage for one or more types of objects corresponding to respective domains, in addition to or instead of the travel domain. For example, the remote computing system 104 that is a server operated by an airline, hotel, car rental agency, or travel agency, stores or provides various travel and itinerary data at the travel object storage. Generally, travel objects are, but are not limited to, availability information or offers specific to an airline, hotel, car rental agency, and/or other aspect of travel.

The user device communication channel 180 can communicate instructions between the provider computing system 102 and the user device 103 according to a first communication protocol compatible with the user device 103 or any component thereof. For example, the user device communication channel 180 can include a first API configured to transmit instructions indicative of a given domain and given parameters corresponding to the given domain. For example, the user device communication channel 180 can transmit instructions to present indications of parameters corresponding to a travel domain and generated by the parameter optimization circuit 140. For example, the user device communication channel 180 can receive instructions indicative of input at a user interface at the user device 103, of data corresponding to a travel domain and generated by the parameter optimization circuit 140. The remote system communication channel 182 can communicate instructions between the provider computing system 102 and the remote computing system 104 according to a second communication protocol compatible with the remote computing system 104 or any component thereof. For example, the remote system communication channel 182 can include a second API configured to receive instructions indicative of a given domain and given parameters corresponding to the given domain. For example, the remote system communication channel 182 can receive instructions corresponding to travel objects or parameters thereof.

The user device communication channel 180 and the remote system communication channel 182 can communicatively couple the provider computing system 102 (e.g., the system processor 110) with an external device. An external device can include, but is not limited to, a smartphone, mobile device, wearable mobile device, tablet computer, desktop computer, laptop computer, cloud server, local server. The user device communication channel 180 and the remote system communication channel 182 can communicate one or more instructions, signals, conditions, states, or the like between one or more of the system processors 110 and components, devices, blocks operatively coupled or couplable therewith. The user device communication channel 180 and the remote system communication channel 182 can include one or more digital, analog, or like communication channels, lines, traces, or the like. As one example, the user device communication channel 180 and the remote system communication channel 182 can include at least one serial or parallel communication line among multiple communication lines of a communication interface. The user device communication channel 180 and the remote system communication channel 182 can include one or more wireless communication devices, systems, protocols, interfaces, or the like. The user device communication channel 180 and the remote system communication channel 182 can include one or more logical or electronic devices including but not limited to integrated circuits, logic gates, flip flops, gate arrays, programmable gate arrays, and the like. The user device communication channel 180 and the remote system communication channel 182 can include one or more telecommunication devices including but not limited to antennas, transceivers, packetizers, and wired interface ports. Any electrical, electronic, or like devices, or components associated with the user device communication channel 180 and the remote system communication channel 182 can also be associated with, integrated with, integrable with, replaced by, supplemented by, complemented by, or the like, the system processor 110 or any component thereof.

Figure 2:
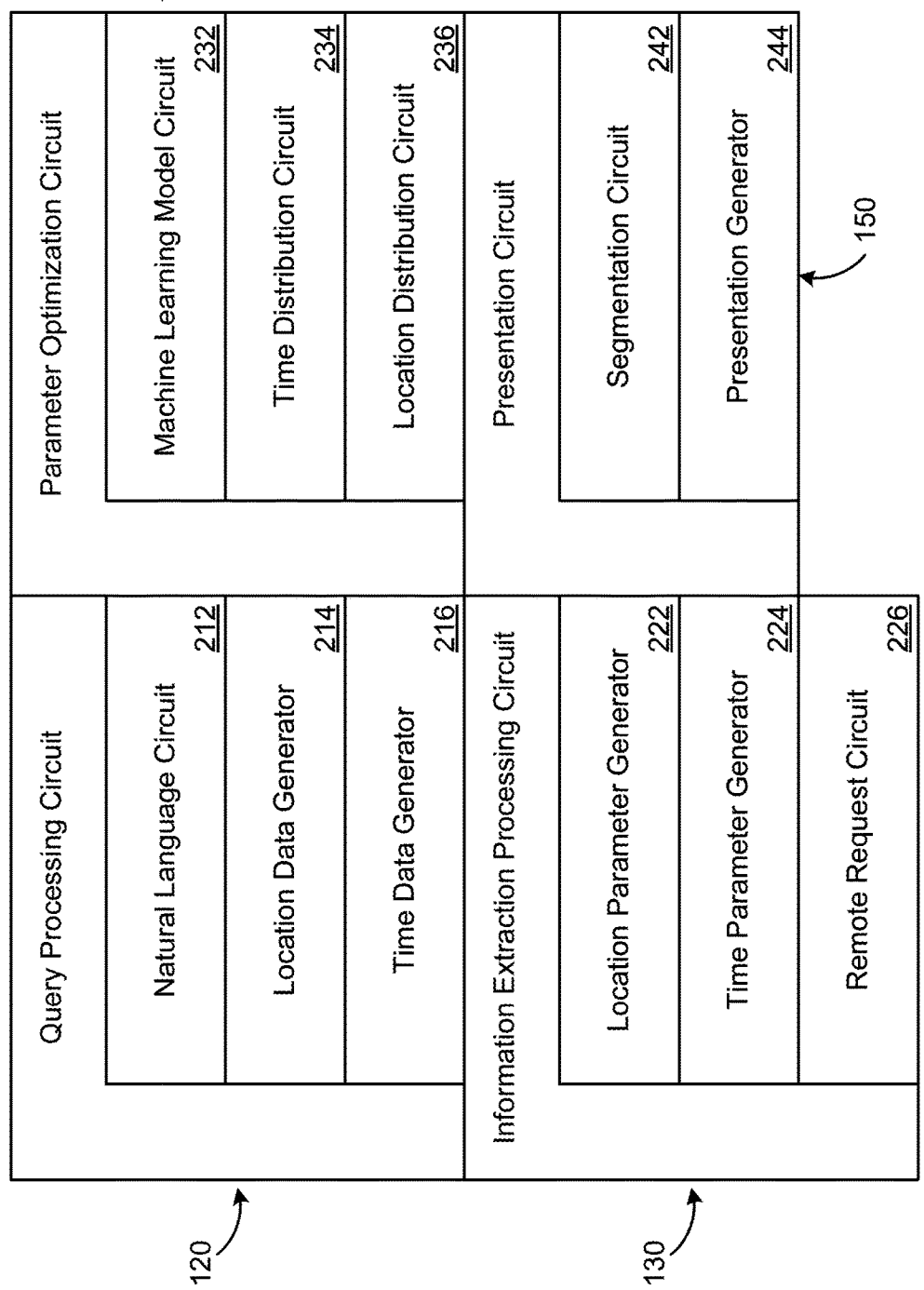
FIG. 2 depicts a system architecture of the provider computing system of FIG. 1, according to an example embodiment.

Based on the foregoing, referring now to FIG. 2, a system architecture for the provider computing system 102 (or portion thereof) is shown, according to an example embodiment. As illustrated by way of example in FIG. 2, a system architecture 200 can include at least a query processing circuit 120, an information extraction processing circuit 130, a parameter optimization circuit 140, and a presentation circuit 150.

The query processing circuit 120 can include a natural language circuit 212, a location data generator circuit 214, and a time data generator circuit 216. The natural language circuit (NLP) 212 can correspond at least partially in one or more of structure and operation to the NLP discussed herein. For example, the NLP 212 can include one or more tokenizers configured to tokenize an input based on a corresponding tokenizer library. For example, the NLP 212 can include a first tokenizer corresponding to a natural language grammar. The first tokenizer can tokenize text of a given query according to part-of-speech of a natural language grammar. For example, the NLP 212 can include a second tokenizer corresponding to a domain grammar. The second tokenizer can tokenize text of a given query according to part-of-domain according to a given parameter in a given domain, a given value of a given parameter in the given domain, or any combination thereof. The NLP 212 can execute one or more tokenizers on a given query to achieve the technical improvement of tokenization according to a plurality of natural language and domain grammars. The location data generator circuit 214 can generate one or more data corresponding to location. For example, the location data generator circuit 214 can select and execute a travel-domain tokenizer according to the second tokenizer, to identify one or more location fragments in the given query each corresponding to a given location. The time data generator circuit 216 can generate one or more data corresponding to times as discussed herein. For example, the time data generator circuit 216 can select and execute a travel-domain tokenizer according to the second tokenizer, to identify one or more time fragments in the given query each corresponding to a given time, time period, or time range.

The natural language circuit 212, the location data generator circuit 214, and the time data generator circuit 216 are illustrated by way of example as distinct from each other and from the various components of the computing system 100. However, one or more of the natural language circuits 212, the location data generator circuit 214, and the time data generator circuit 216 can be integrated with each other or other components of the provider computing system 102 and, in some embodiments, of the computing system 100. For example, the one or more of the natural language circuits 212, the location data generator circuit 214, and the time data generator circuit 216 are integrated into or allocated to various processors or cores of processors of the query processing circuit 120. For example, the one or more of the natural language circuits 212, the location data generator circuit 214, and the time data generator circuit 216 are integrated into or allocated to various cores of the system processor 110.

The information extraction processing circuit 130 can include a location parameter generator circuit 222, a time parameter generator circuit 224, and a remote request circuit 226. The location parameter generator circuit 222 can generate one or more location parameters from one or more corresponding location data. For example, the location parameter generator circuit 222 can correlate a given location data to a predetermined location parameter according to a location transformation data. For example, the location transformation data can correspond to a link between a location data and one or location parameters. For example, the location data "NorCal" can correspond to a plurality of location parameters including "San Francisco," "Sacramento," and "Redding" that respectively indicate municipal jurisdictions linked with the "NorCal" location data.

The time parameter generator circuit 224 can generate one or more time parameters from one or more corresponding time data relating to a non-bounded trip query (or other query). For example, the time parameter generator circuit 224 can correlate a given time data to a predetermined time parameter according to a time transformation data. For example, the time transformation data can correspond to a link between a time data and one or time parameters. For example, the time data "weekend" can correspond to a plurality of time parameters including "Saturday," and "Sunday" that respectively indicate days of the week linked with the "weekend" time data. For example, the time data "long weekend" can correspond to a plurality of time parameters including "Friday," "Saturday," and "Sunday" that respectively indicate days of the week linked with the "weekend" time data. For example, the time data "spring break" can correspond to a plurality of time parameters including "March," and "April" that respectively indicate months linked with the "spring break" time data. The remote request circuit 226 can generate one or more requests configured to include parameters of a given domain. The remote request circuit 226 can communicate with the remote computing system 104 according to the second communication protocol compatible with the remote computing system 104.

The location parameter generator circuit 222, the time parameter generator circuit 224, and the remote request circuit 226 are illustrated by way of example as distinct from each other and from the various components of the computing system 100. However, one or more of the location parameter generator circuits 222, the time parameter generator circuit 224, and the remote request circuit 226 can be integrated with each other or other components of the provider computing system 102 (or other components of the computing system 100). For example, the one or more of the location parameter generator circuits 222, the time parameter generator circuit 224, and the remote request circuit 226 are integrated into or allocated to various processors or cores of processors of the information extraction processing circuit 130. For example, the one or more of the location parameter generator circuits 222, the time parameter generator circuit 224, and the remote request circuit 226 are integrated into or allocated to various cores of the system processor 110.

The parameter optimization circuit 140 can include a machine learning model circuit 232, a time distribution circuit 234, and a location distribution circuit 236. The machine learning (ML) model circuit 232 can correspond at least partially in one or more of structure and operation to the ML circuit as discussed herein. For example, the ML model circuit 232 can identify one or more parameters corresponding to a given domain, and can generate one or more predictions according to the parameters corresponding to the given domain. For example, the ML model circuit 232 can receive an indication that parameters correspond to a given domain, or can detect, according to one or more received parameters, that the received parameters correspond to a given domain. For example, the ML model circuit 232 can determine one or more distributions of one or more values across one or more parameters. The time distribution circuit 234 can identify one or more time parameters or time values corresponding to a prediction by the ML model circuit 232. For example, the time distribution circuit 234 can generate a predictive distribution for frequency of selection of travel objects according to a time parameter indicative of a duration of travel. The location distribution circuit 236 can identify one or more location parameters or time values corresponding to a prediction by the ML model circuit 232. For example, the time distribution circuit 234 can generate a predictive distribution for frequency of selection of travel objects according to a location parameter indicative of a destination of travel.

The ML model circuit 232 can include or execute one or more models to perform various optimizations on data including location data and time data. For example, the ML model circuit 232 performs personalized recommendation ML modeling. By leveraging user data, such as preferred airlines, seat preferences, meal plans, and other relevant information, the ML model circuit 232 can provide personalized recommendation models. These models consider individual user preferences to suggest flight options that align with their specific needs and preferences. This customization enhances the user experience and increases the likelihood of finding suitable travel itineraries.

The ML model circuit 232 can provide similarity recommendation modeling. For example, based on user interest patterns and behavior, the ML model circuit 232 can develop similarity recommendation models. These models analyze historical data to identify patterns among users with similar preferences and interests. By understanding these patterns, the provider computing system 102 can recommend travel options that are popular among users with similar profiles (e.g., travelers who travel to similar locations may be deemed similar, etc.). This approach increases the likelihood of providing relevant and appealing travel suggestions. For example, the ML model circuit 232 can generate frequency distributions to identify similarity, based on the previous activity of users in selecting various travel trips after entering non-bounded queries. The ML model circuit 232, as one example, identifies similarity by matching a non-bounded input by a user to previous non-bounded input by other users of the provider computing system 102.

The ML model circuit 232 can provide automated seasonal destinations recommendations. Here, by analyzing historical travel data, the provider computing system 102 can identify popular seasonal destinations. This information can be utilized to automatically recommend destinations that are highly sought-after during specific seasons or time periods. By considering factors such as weather, events, and attractions, the provider computing system 102 can suggest destinations that align with user preferences and the time of year (or another given time period). For example, the ML model circuit 232 can identify times and dates that match given non-bounded queries for flight itineraries over a given month or upcoming weekends, and can recommend trip durations that match the peaks of the frequency distribution. The frequency distribution for non-bounded queries for flight itineraries are based on airline data at the remote computing system 104, for example.

The ML model circuit 232 can provide lodging and activities booking recommendation modeling. Here, the provider computing system 102 can incorporate a recommendation model for lodging and activities. Based on the destination chosen in the flight recommendation, the model suggests suitable lodging options (hotels, rentals, etc.) and activities or attractions in the selected destination. This comprehensive approach provides users with a seamless travel planning experience by offering personalized recommendations for their entire journey. The ML model circuit 232 can provide lodging and activities booking recommendations in addition to or in place of flight recommendations as discussed herein. For example, the ML model circuit 232 can identify times and dates that match given non-bounded queries for hotel stays over a given month or upcoming weekends, and can recommend trip durations that match the peaks of the frequency distribution. The frequency distribution for non-bounded queries for hotel stays are based on hotel data at the remote computing system 104, for example.

The machine learning model circuit 232, the time distribution circuit 234, and the location distribution circuit 236 are illustrated by way of example as distinct from each other and from the various components of the computing system 100. However, one or more of the machine learning model circuits 232, the time distribution circuit 234, and the location distribution circuit 236 can be integrated with each other or other components of the provider computing system 102 and/or other components of the 100. For example, the one or more of the machine learning model circuits 232, the time distribution circuit 234, and the location distribution circuit 236 are integrated into or allocated to various processors or cores of processors of the parameter optimization circuit 140. For example, the one or more of the machine learning model circuits 232, the time distribution circuit 234, and the location distribution circuit 236 are integrated into or allocated to various cores of the system processor 110.

The presentation circuit 150 can include a segmentation circuit 242 and a presentation generator circuit 244. The segmentation circuit 242 can select portions of the user interface, according to one or more parameters of a given domain. For example, the segmentation circuit 242 can determine that a given domain corresponds to a travel domain, and can segment a user interface into a plurality of portions, where each of the plurality of portions correspond to the given domains. The presentation generator circuit 244 can create one or more outputs corresponding to parameters of a given domain in accordance with one or more templates and UI data. For example, the presentation generator circuit 244 can generate a user interface to include various output information.

The machine learning model circuit 232, the segmentation circuit 242 and the presentation generator circuit 244 are illustrated by way of example as distinct from each other and from the various components of the provider computing system 102 and/or other components of the computing system 100. However, one or more of the segmentation circuits 242 and the presentation generator circuit 244 can be integrated with each other or other components of the provider computing system 102 and/or other components of the computing system 100. For example, the one or more of the segmentation circuits 242 and the presentation generator circuit 244 are integrated into or allocated to various processors or cores of processors of the presentation circuit 150. For example, the one or more of the segmentation circuits 242 and the presentation generator circuit 244 are integrated into or allocated to various cores of the system processor 110.

Figure 3:
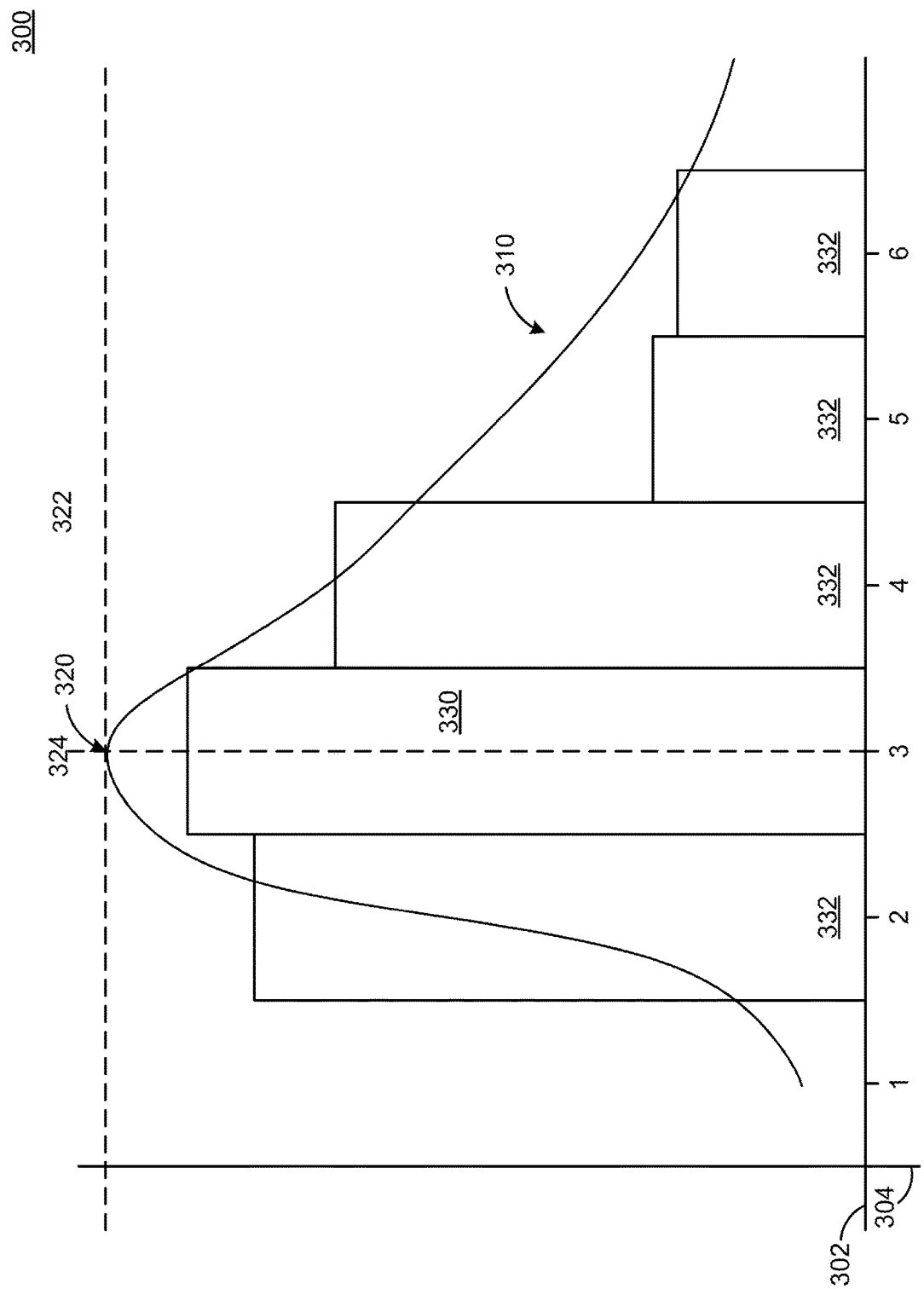
FIG. 3 depicts a frequency distribution model, according to an example embodiment.

Based on the foregoing, referring now to FIG. 3, a frequency distribution, is shown according to an example embodiment. As illustrated by way of example in FIG. 3, a frequency distribution 300 can include at least duration parameter axis 302, selection parameter axis 304, a selection distribution 310, a peak selection frequency 322, and an optimal duration 324. The frequency distribution 300 may be used by the provider computing system 102 to identify a peak of customer popularity for parameter of a travel trip, such predicted or determined preferred dates or time windows for the trip. The frequency distribution can be generated by ML model circuit 232 based on historical data stored at the remote computing system 104, at a travel object storage of the remote computing system 104, and/or stored by the provider computing system 102. The frequency distribution is one example of a frequency distribution having one peak, where customer popularity is highest for a single length of trip (time duration). In this example, there is one number of days that is most popular with all other options being relatively less popular.

The duration parameter axis 302 can indicate a parameter corresponding to a domain. For example, and with respect to a travel domain, the duration parameter axis 302 can correspond to a parameter indicative of a duration of a given trip to a given destination or between a given origin and a given destination. The duration parameter axis 302 is not limited to indicating parameters corresponding to the travel domain, and can be indicative of any parameter of any domain. The selection parameter axis 304 can indicate a property of a parameter corresponding to a domain. For example, the selection parameter axis 304 can indicate a plurality of values of corresponding parameters according to a frequency or aggregate number of times of selection. For example, with respect to the travel domain, the selection parameter axis 304 can indicate a number of times a particular trip for a particular duration was selected at one or more user interfaces corresponding to one or more user devices 103 by one or more travelers. Thus, the selection parameter axis 304 can indicate a frequency or popularity of a selection with respect to a given parameter of a given domain.

The selection distribution 310 indicates a performance of a parameter of a given domain. A given domain is, for example, an airline search, a hotel search, a car rental search, or a combination search of multiple of these (or others). For example, the selection distribution 310 can correspond to a frequency distribution of values of a parameter across a time period. The selection distribution 310 can include a distribution peak 320. In operation, then, the ML circuit 232 can generate the selection distribution 310 for a future time period based on selection data indicative of trip objects selected via user interface input during a historical time period preceding the future time period. The distribution peak 320 can correspond to a value of a parameter corresponding a highest number or frequency of selection of a parameter. For example, the selection distribution 310 can be indicative of a value of a parameter most likely to be selected in a future time period indicated by a time data. The peak selection frequency 322 can correspond to a quantitative metric indicative of the frequency of selection at the distribution peak 320. The optimal duration 324 can correspond to a quantitative metric indicative of the frequency of a time duration at the distribution peak 320. For example, the optimal duration 324 is a duration of a trip of three days, according to the peak popularity frequency 330, which is greater than the lower popularity frequencies 332.

The presentation threshold may be a peak of popularity of the travel trip defined by the non-bounded query. The peak of popularity is, in frequency distribution 300, the distribution peak 320. For example, the presentation threshold is based on input from the one or more users via one or more of the user devices 103. For example, the customer popularity is the frequency distribution 300 for the travel trip, and the presentation threshold is a maximum of the frequency distribution at the peak selection frequency 322.

Figure 4A:
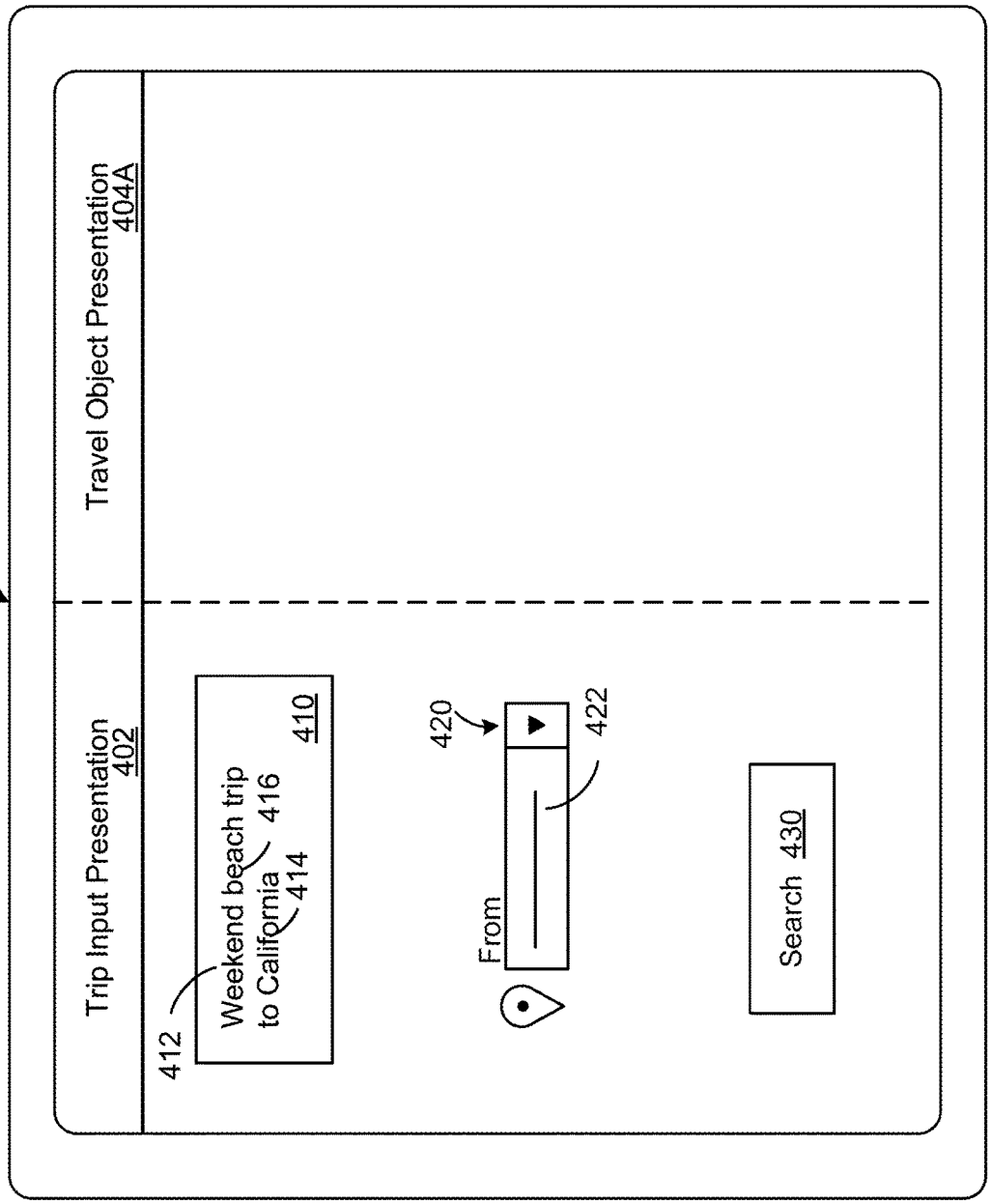
FIG. 4A depicts a user interface, according to an example embodiment.

Based on the foregoing and referring now to FIG. 4A, a user device presenting a user interface is shown according to an example embodiment. As illustrated by way of example in FIG. 4A, the user device 103 presents, via the client application 174, a user interface 400A that includes at least a trip input presentation 402, and a travel object presentation before input 404A. The trip input presentation 402 can correspond to a portion of the user interface 400 configured to receive input from a user. The trip input presentation 402 can include a query input field 410, a location input field 420, and a control button 430. The travel object presentation before input 404A can correspond to a portion of the user interface 400A before presentation of a response according to the trip input presentation 402.

The query input field 410 may receive a non-bounded query, such as text, input. In the example shown, the query input field 410 is a text box. The query input field 410 can receive a query having a time data 412, a location data 414, and a property data 416. The time data 412 is a portion of the query indicative of a period of time. For example, the time data 412 can correspond to "weekend" indicative of the days discussed herein. The location data 414 can correspond to a portion of the query indicative of one or more locations as discussed herein. For example, the location data 414 can correspond to "California" indicative of the state of California. The property data 416 can correspond to a portion of the query indicative of a property of a travel object or a location. For example, the property data 416 can correspond to a "beach" token, indicative of one or more locations or travel objects linked with a "beach" token or identifier corresponding to the "beach" token. The property is, for example, a desirable or identifying aspect of a travel trip, like a "beach" trip as discussed above.

The location input field 420 can receive a location input. For example, the location input field 420 can link a received location with an origin location. For example, the location input field 420 can correspond to drop-down menu. For example, the location input field 420 can correspond to one or more locations corresponding to a detected location of the user device 103. The location input field 420 can include a location presentation 422. The location presentation 422 can correspond to a text identifier or description of a location. For example, the location presentation 422 can present an indication of the detected location of the user device 103. For example, the user device can be configured to detect the location of the user device 103 with or without presence or presentation of the location input field 420. The control button 430 can correspond to an input field configured to transmit data corresponding to one or more of the query input fields 410 and the location input field 420. For example, the location input field 420 can correspond to a submit button configured to activate a search for travel objects in the search domain corresponding to the received input.

Figure 4B:
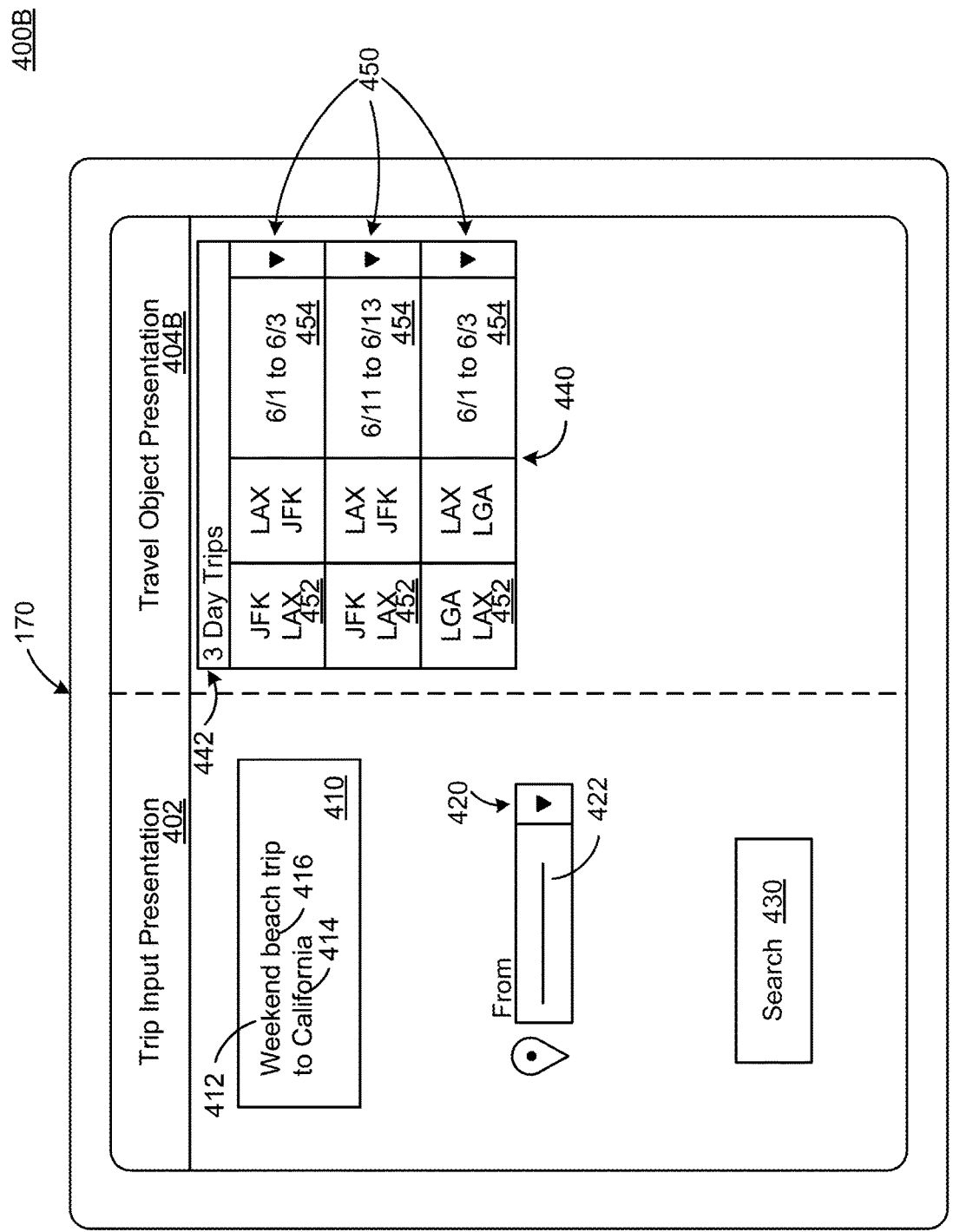
FIG. 4B depicts a user device presenting a user interface including a response, according to an example embodiment.

Based on the foregoing and referring now to FIG. 4B, a user device presenting a user interface including a response is shown according to an example embodiment. As illustrated by way of example in FIG. 4B, the user device 103 presents, via the client application 174, a user interface 400B including a response can include at least a travel object presentation after input 404B, and a travel object presentation 440. The travel object presentation after input 404B can correspond to a portion of the user interface 400A after presentation of a response according to the trip input presentation 402.

The travel object presentation 440 can correspond to a portion of the user interface 400B associated with a time period presentation 442. The travel object presentation 440 can include a plurality of travel option presentations 450. For example, the travel object presentation 440 can indicate that the plurality of travel option presentations 450 are associated with the time period presentation 442. For example, the time period presentation 442 can be indicative of the optimal duration 324 determined according to the frequency distribution model 300. Here, the time period presentation 442 can include a title bar indicating the optimal duration 324.

The travel option presentations 450 can respectively correspond to travel objects satisfying the optimal duration 324. The travel option presentations 450 include travel location parameters 452 and travel time parameters 454. The travel location parameters 452 can indicate an origin location corresponding to the location input field 420 and a destination location corresponding to the location data 414. For example, the optimal parameter can correspond to the optimal duration 324, in the travel domain. The optimal duration can be identified by the ML model circuit 232 via an algorithm to identify relative maxima in a frequency distribution. The travel time parameters 454 can indicate times as discussed herein for travel objects having times and locations satisfying both the location data 414 and the time data 412. For example, the optimal parameter can correspond to the optimal duration 324 of a travel trip according to a popularity of selection by one or more users, in the travel domain. Thus, the travel option presentations 450 is an example in one domain of presentations that can indicate one or more parameters corresponding to a given domain and satisfying a value of an optimal parameter.

Based on the foregoing and referring now to FIG. 4C, a user device presenting a user interface including a response is shown according to an example embodiment. As illustrated by way of example in FIG. 4C, the user device 103 presents, via the client application 174, a user interface 400C including a response can include at least the trip input presentation 402, the query input field 410, the time data 412, the location data 414, the property data 416, the control button 430, the travel object presentation 440, and the travel option presentations 450.

Figure 5:
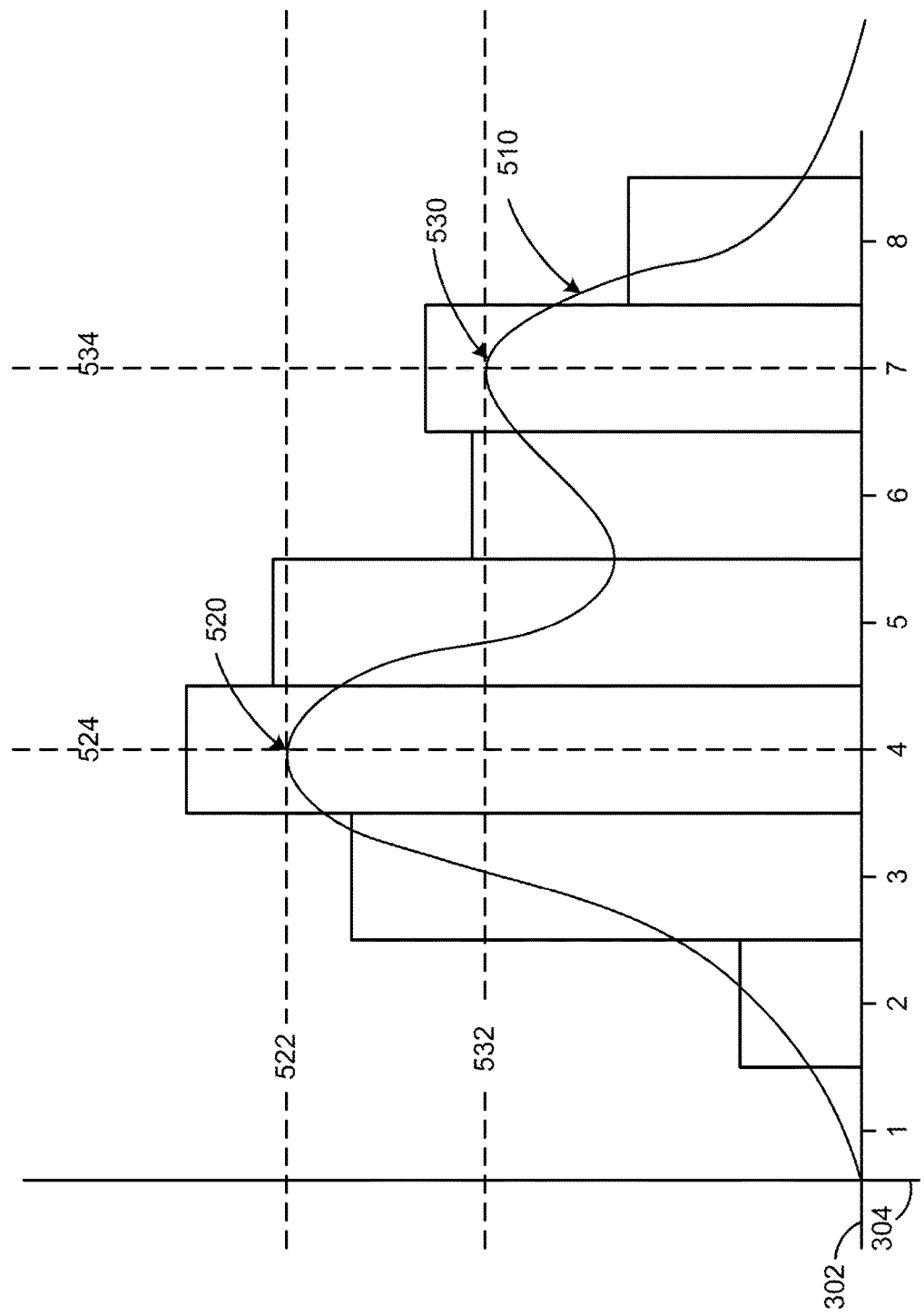
FIG. 5 depicts a multi-peak frequency distribution model, according to an example embodiment.

Referring now to FIG. 5, a multi-peak frequency distribution model is shown, according to an example embodiment. As illustrated by way of example in FIG. 5, a multi-peak frequency distribution model 500 can include at least a selection distribution 510. The multi-peak frequency distribution model 500 may be used by the provider institution computing system 102 to identify multiple peaks of customer popularity for predicted dates or time windows of a travel trip, to provide multiple options for trip lengths. The frequency distribution can be generated by ML model circuit 232 based on historical data stored at the remote computing system 104, at a travel object storage of the remote computing system 104, and/or stored by the provider computing system 102. The frequency distribution of the multi-peak frequency distribution model 500 is one example of a frequency distribution having two peaks, where customer popularity is relatively highest for two different lengths of a trip. In this example, there are two numbers of days that are most popular, resulting in a first option of a shorter trip and a second option of a longer trip.

The selection distribution 510 can indicate a performance of a parameter of a given domain having a plurality of peaks. For example, the selection distribution 510 can correspond to a frequency distribution of values of a parameter across a time period. For example, the ML circuit can generate the selection distribution 510 for a future time period based on selection data indicative of trip objects selected via user interface input during a historical time period preceding the future time period. The selection distribution 510 can include a first distribution peak 520, and a second distribution peak 530.

The first distribution peak 520 can correspond to a first value of a parameter corresponding a first relative peak in a number or frequency of selection of a parameter. The first distribution peak 520 can include a first peak selection frequency 522, and a first optimal duration 524. The first peak selection frequency 522 can correspond to a quantitative metric indicative of the frequency of selection at the first distribution peak 520. The first optimal duration 524 can correspond to a quantitative metric indicative of the frequency of a first time duration at the first distribution peak 520. For example, the first optimal duration 524 can correspond to a duration of a trip of four days, according to a travel domain.

The second distribution peak 530 can correspond to a second value of a parameter corresponding to a second relative peak in a number or frequency of selection of a parameter. The second distribution peak 530 can include a second peak selection frequency 532, and a second optimal duration 534. The second peak selection frequency 532 can correspond to a quantitative metric indicative of the frequency of selection at the second distribution peak 530. The second optimal duration 534 can correspond to a quantitative metric indicative of the frequency of a second time duration at the distribution peak 320. For example, the second optimal duration 534 can correspond to a duration of a trip of seven days, according to a travel domain. The second optimal duration 534 can be a relative maximum less than the first optimal duration 524.

Figure 6A:
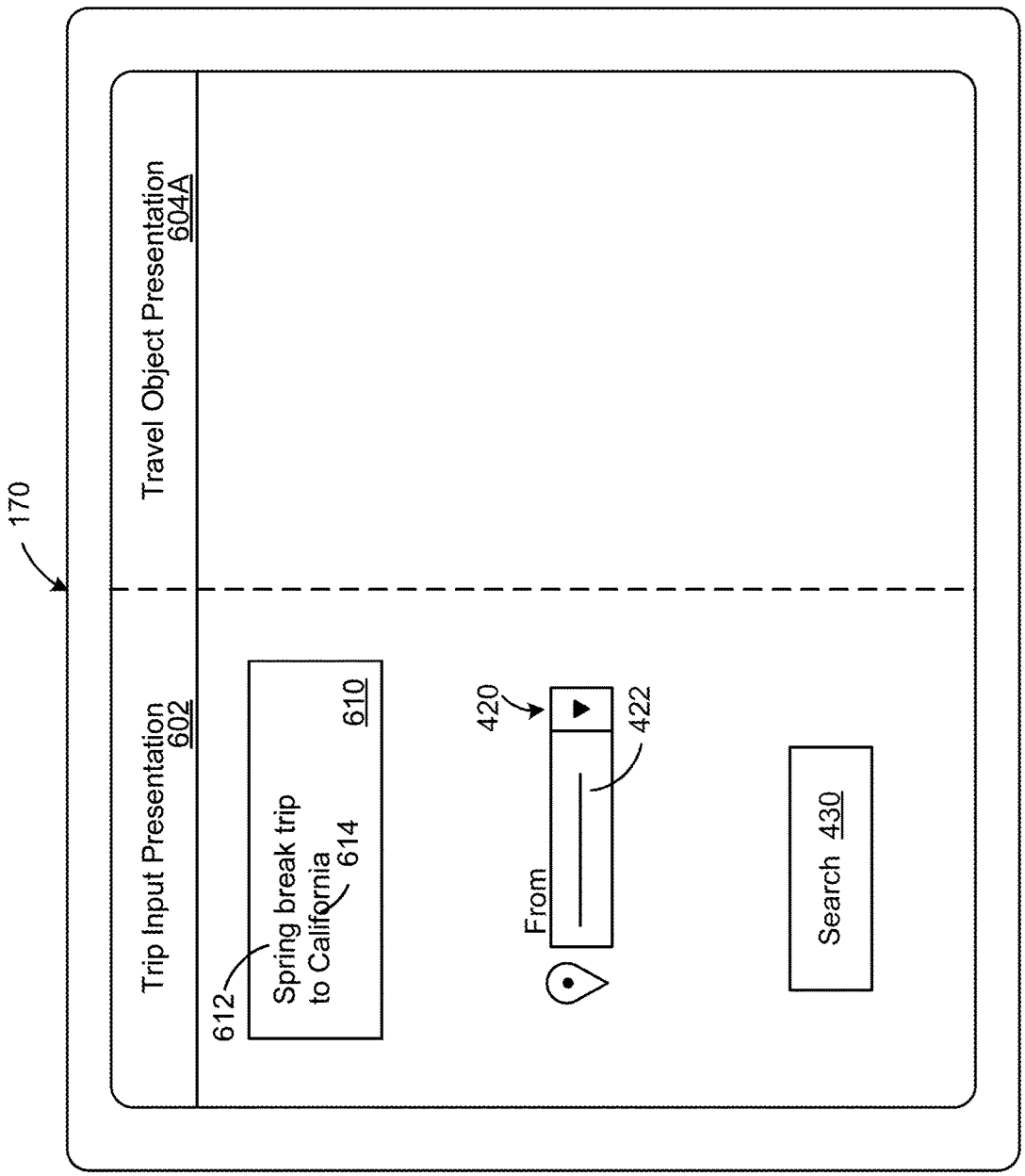
FIG. 6A depicts a user device presenting a user interface, according to an example embodiment.

Based on the foregoing, referring now to FIG. 6A, a user device presenting a user interface is shown according to an example embodiment. As illustrated by way of example in FIG. 6A, the user device 103 presents, via the client application 174, a user interface 600A that includes at least a trip input presentation 602. The trip input presentation 602 can correspond at least partially in one or more of structure and operation to the trip input presentation 402. The trip input presentation 602 can include a query input field 610. The query input field 610 can correspond at least partially in one or more of structure and operation to the query input field 410. The query input field 610 can include time and property data 612, and location data 614. The time and property data 612 and the location data 614 are, in this example, portions of a non-bounded input.

The time and property data 612 can correspond at least partially in one or more of structure and operation to both the time data 412 and the property data 416. For example, the time and property data 612 can be linked with one or more locations according to the property data 416, and can be linked with one or more time periods according to the time data 412. As a specific example, the time and property data 612 can correspond to "spring break" indicative of the months discussed herein, and can correspond to locations associated with high frequency of travel during the months discussed herein. The location data 614 can correspond at least partially in one or more of structure and operation to the location data 414.

Figure 6B:
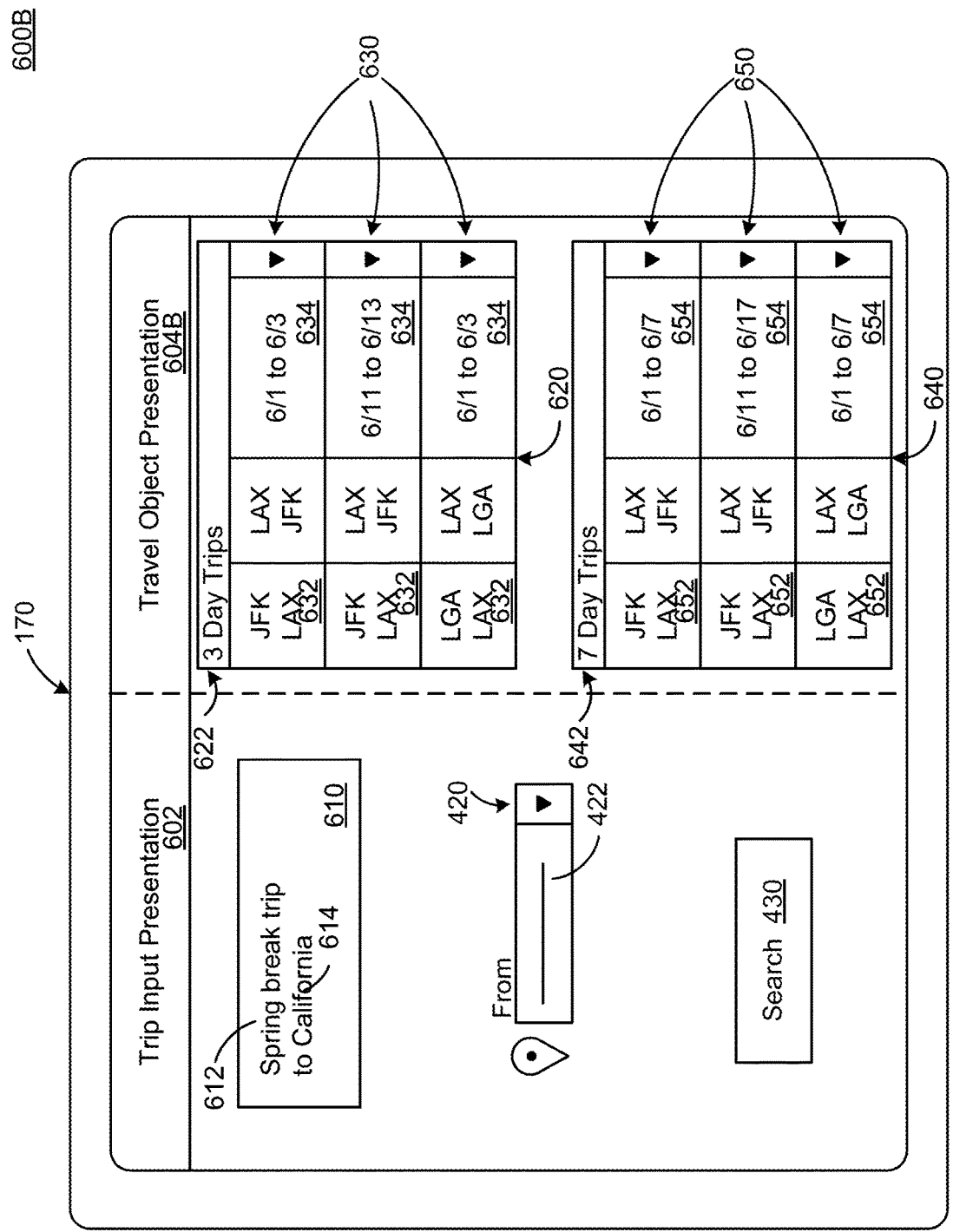
FIG. 6B depicts a user device presenting a user interface including a plurality of responses, according to an example embodiment.

Based on the foregoing, referring now to FIG. 6B, a user device presenting a user interface including a plurality of responses is shown according to an example embodiment. As illustrated by way of example in FIG. 6B, the user device 103 presents, via the client application 174, a user interface 600B including a plurality of responses that includes at least a travel object presentation 604B.

The travel object presentation 604B can correspond at least partially in one or more of structure and operation to the travel object presentation 404B. The travel object presentation 604B can correspond to a portion of the user interface 600A after presentation of a response according to the trip input presentation 602. The travel object presentation 604B can include a first travel response object 620 and a second travel response object 640.

The first travel response object 620 can correspond to a first portion of the user interface 600B associated with a first time period presentation 622. The first travel object presentation 620 can include a plurality of first travel option presentations 630. For example, the first travel object presentation 620 can indicate that the plurality of first travel option presentations 630 are associated with the first time period presentation 622. For example, the first time period presentation 622 can be indicative of the first optimal duration 524 determined according to the multi-peak frequency distribution model 500. Here, the first time period presentation 622 can include a title bar indicating the first optimal duration 524.

The second travel response object 640 can correspond to a second portion of the user interface 600B associated with a first time period presentation 622. For example, the second portion of the user interface 600B can be at least partially different from the first portion of the user interface 600B. The second travel response object 640 can include a plurality of second travel option presentations 650. For example, the second travel response object 640 can indicate that the plurality of second travel option presentations 650 are associated with the second time period presentation 642. For example, the second time period presentation 642 can be indicative of the second optimal duration 534 determined according to the multi-peak frequency distribution model 500. Here, the second time period presentation 642 can include a title bar indicating the second optimal duration 534.

For example, the ML model circuit 232 can identify, from among the second set, a third set of the travel results that meet a second presentation threshold. With respect to FIG. 6B, the second presentation threshold is the second distribution peak 530 for the second time period presentation 642. The presentation circuit 150 can present, via the user interface 600B, one or more travel results of the third set, and the second presentation threshold. With respect to FIG. 6B, the third set is the second travel response object 640. For example, the presentation circuit 150 can present, via the user interface 600B, the travel results of the second set and the presentation threshold at a first portion of the user interface. The presentation circuit 150 can present, via the user interface 600B, the travel results of the third set and the second presentation threshold at a second portion of the user interface.

For example, the ML model circuit 232 can identify, from among the second set, a third set of the travel results that meet a second presentation threshold. The presentation circuit 150 can present, via the user interface 600B, one or more travel results of the third set, and the second presentation threshold. For example, the presentation circuit 150 can present, via the user interface 600B, the travel results of the second set and the presentation threshold at a first portion of the user interface, as illustrated in FIG. 6B. The system can present, via the user interface 600B, the travel results of the third set and the second presentation threshold at a second portion of the user interface 600B, as illustrated in FIG. 6B.

Figure 7:
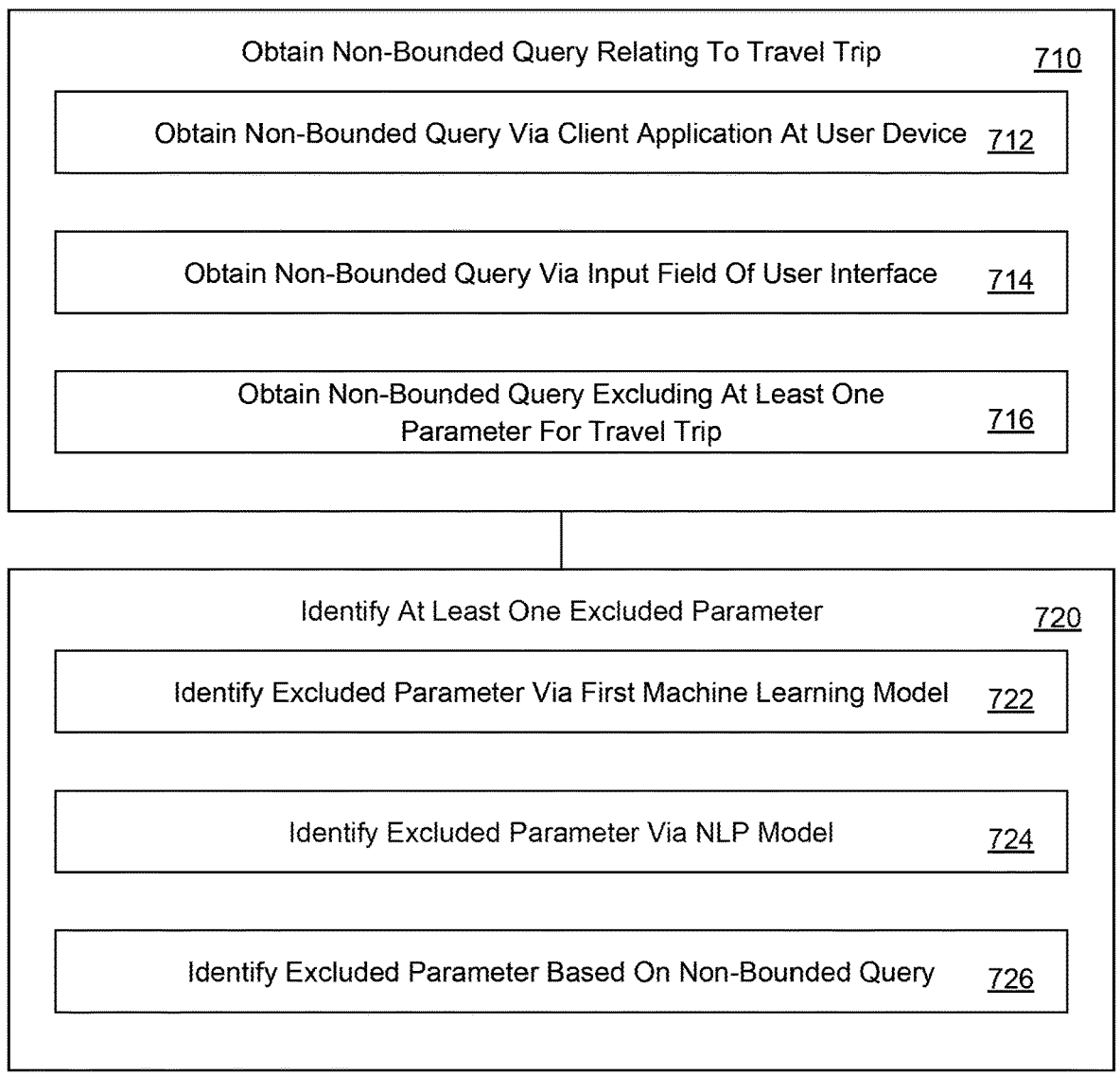
FIG. 7 depicts a method of domain-optimized search querying via data input, according to an example embodiment.

Based on the foregoing, referring now to FIG. 7, a method of providing search queries and responses using parameters optimized by machine learning is shown, according to an example embodiment. At least one of the computing system 100, the provider computing system 102, the system architecture 200, or a component thereof, can perform method 700 or portions thereof. The method 700 is directed to a process for capturing user input via the client application 174 and identifying text within the user input that defines various parameters of the query. For example, the query processing unit 120 of the provider computing system 102 can obtain a non-bounded query at input field 410 or 610, and can perform the aspects of method 700 discussed below. However, performance of method 700 is not limited to execution according to the example circuits discussed herein. The interface circuit 112, as an example, transmits a request to obtain the first set of the travel results matching the non-bounded query, and receives the first set of the travel results as discussed herein.

At 710, a non-bounded query relating to a travel trip is obtained. For example, the user device 103 obtains the query via the user interface 400A. At 712, the non-bounded query is obtained via the client application 174 at the user device 103. For example, the user device 103 executes the client application 174 to present the user interface 400A at a display of the user device 103. At 714, the non-bounded query is obtained via an input field of a user interface. For example, the client application 174 captures the user input of the query at the input field 410. Specifically, the client application captures input of the text "weekend beach trip to California" at the input field 410 or 610. At 716, the non-bounded query is obtained excluding at least one parameter for the travel trip. For example, an excluded parameter is a parameter that narrows a search query and is not included in the query. With respect to the input fields 410 and 610, an excluded parameter is a specific date and time of departure. With respect to the input fields 410 and 610, an excluded parameter is a specific airport of origin and of destination. With respect to the input fields 410 and 610, an excluded parameter is a specification of an airline booking, a travel booking, or a car rental booking. Thus, the query can be non-bounded in that it is missing at least one parameter than will narrow the query. In some instances, the query can be non-bounded in that it is missing at least one parameter than is required to narrow the query.

At 720, the at least one excluded parameter is identified. For example, the query processing circuit 120 or the natural language circuit 212 identifies the excluded parameter. With respect to FIGS. 4A and 6A, the natural language circuit 212 identifies the data 412, 414 and 416, 612 and 614, respectively. These can be considered to be important criteria to the user searching for flight information, that the natural language circuit 212 identifies. At 722, the at least one excluded parameter is identified via a first machine learning model. The first machine learning mode, in this example, is an NLP model. At 724, the excluded parameter is identified via an NLP model. In this example, the NLP model is configured to detect particular dates, places, locations, time ranges, time periods, and locations as discussed herein, that are relevant to a domain for travel trips. At 726, the excluded parameter is identified based on the non-bounded query. In this example, the natural language circuit 212 identifies the location "California" from the location data 414 and 614, and a time period from time data 412 and 414. For example, the natural language circuit 212 can extract, from the query at the input field 410, a first natural language text fragment of the non-bounded query. As discussed herein, time data can include date information, as in, for example a UNIX timestamp that includes both time and date information. For example, the natural language circuit 212 extracts, from the non-bounded query at the input field 410 or 610 the first natural language text fragment of the non-bounded query.

Figure 8:
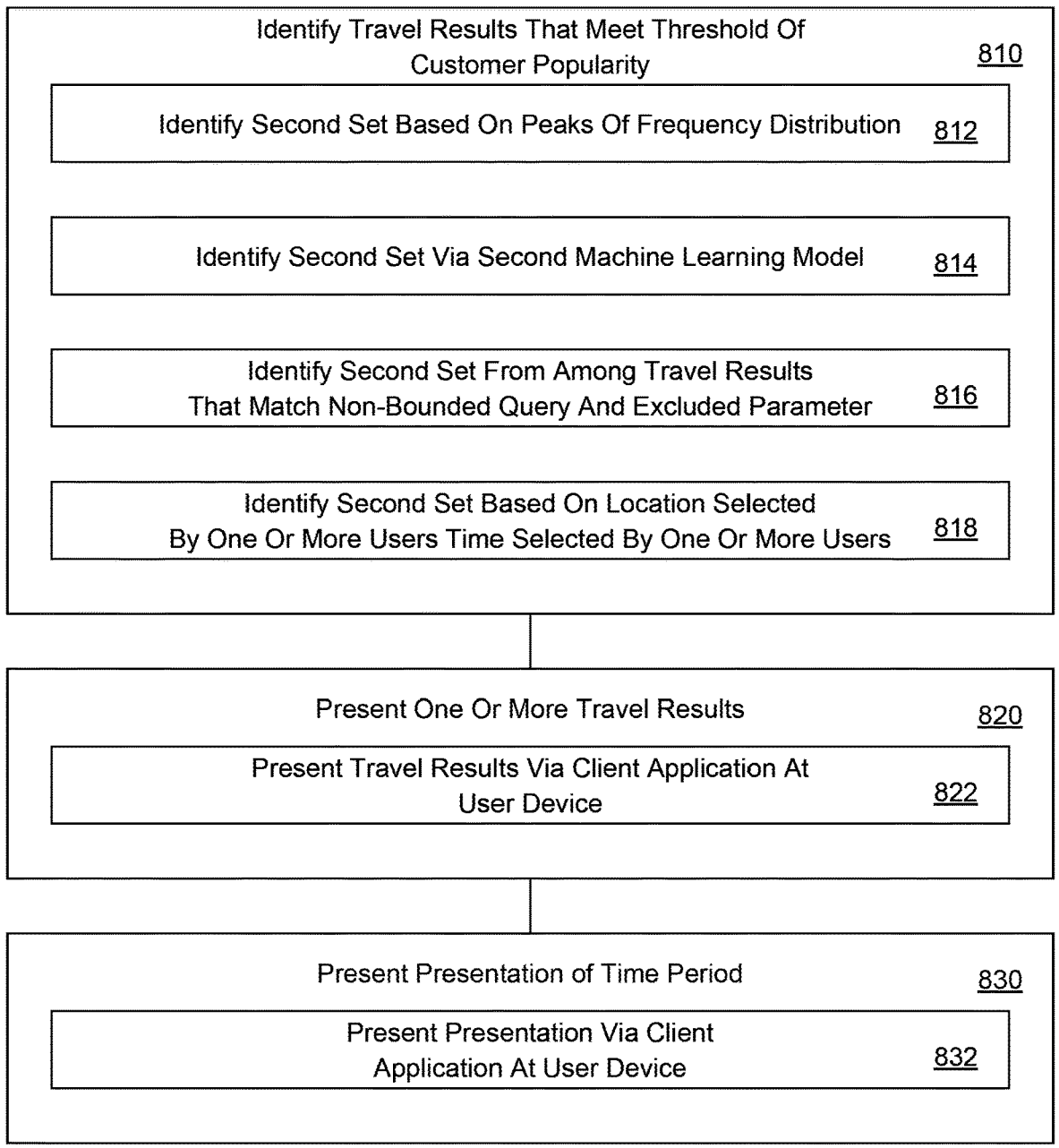
FIG. 8 depicts a method of domain-optimized search querying via data input, according to an example embodiment.

Based on the foregoing, referring now to FIG. 8, a method of providing search queries and responses using parameters optimized by machine learning is shown according to an example embodiment. At least one of the computing system 100, the provider computing system 102, the system architecture 200, or a component thereof, can perform method 800. The method 800 is directed to a process for presenting travel results via the client application 174 and identifying optimal travel options as determined by the machine learning systems of this provider computing system 102. For example, the ML model circuit 232 of the parameter optimization circuit 140 can determine optimal travel parameters that are excluded parameters from the non-bounded query, and can perform the aspects of method 800 discussed below. However, performance of method 800 is not limited to execution according to the example circuits discussed herein.

At 810, travel results that meet a threshold of customer popularity are identified in response to a non-bounded query. With respect to FIGS. 4B, 4C and 6B, the ML model circuit 232 determines a set of travel results to be presented at the travel object presentation 404B or 604B. At 812, a second set of travel results based on peaks of a frequency distribution are identified. The ML model circuit 232 determines the set of travel results by generating and evaluating the frequency distribution 300 or 500. At 814, the second set of travel results is identified via a second machine learning model. At 816, the second set of travel results is identified from among travel results that match the non-bounded query and the at least one excluded parameter. For example, the ML model circuit 232 identifies the second set of travel results. At 818, the second set of travel results is identified based on a location selected by one or more users or a time selected by the one or more users. For example, the ML model circuit 232 identifies the vel results is identified based on a location selected by one or more users or a time selected by the one or more users, as illustrated in the identification of the peaks of the frequency distributions 300 and 500.

At 820, one or more travel results is presented. For example, the presentation circuit 150 instructs the client application 174 via the user device communication channel 180 of the network 101 to present the travel results. At 822, the travel results are presented via the client application 174 at the user device 103. For example, the client application 174 causes a display of the user device 103 to display the user interface 400B or 600B including the travel option presentations 450, 630, or 650.

At 830, a presentation indicating a time period is presented. For example, the presentation circuit 150 instructs the client application 174 via the user device communication channel 180 of the network 101 to present the travel results. For example, the presentation indicating the time period is a time period subject to a constraint. For example, a constraint is a maximum of a distribution as discussed herein. For example, With respect to FIGS. 4B, 4C and 6B, the presentation threshold is the time period presentation 442, 622 and 642, and is presented next to the travel results for airline travel trips having those durations. At 832, the presentation threshold is presented via the client application 174 at the user device 103. For example, the presentation circuit 150 instructs the client application 174 via the user device communication channel 180 of the network 101 to present the user interface 400B or 600B including the time period presentation 442, 622 or 642.

The client application 174 can present multiple options where multiple time periods are identified as popular by the ML model circuit 232. For example, from among the second set, a third set of the travel results that meet a second presentation threshold are identified. For example, the third set can be the second travel response object 640. One or more travel results of the third set, and the second presentation threshold are presented via the user interface. For example, the second presentation threshold is a frequency distribution for the travel trip.

Figure 9:
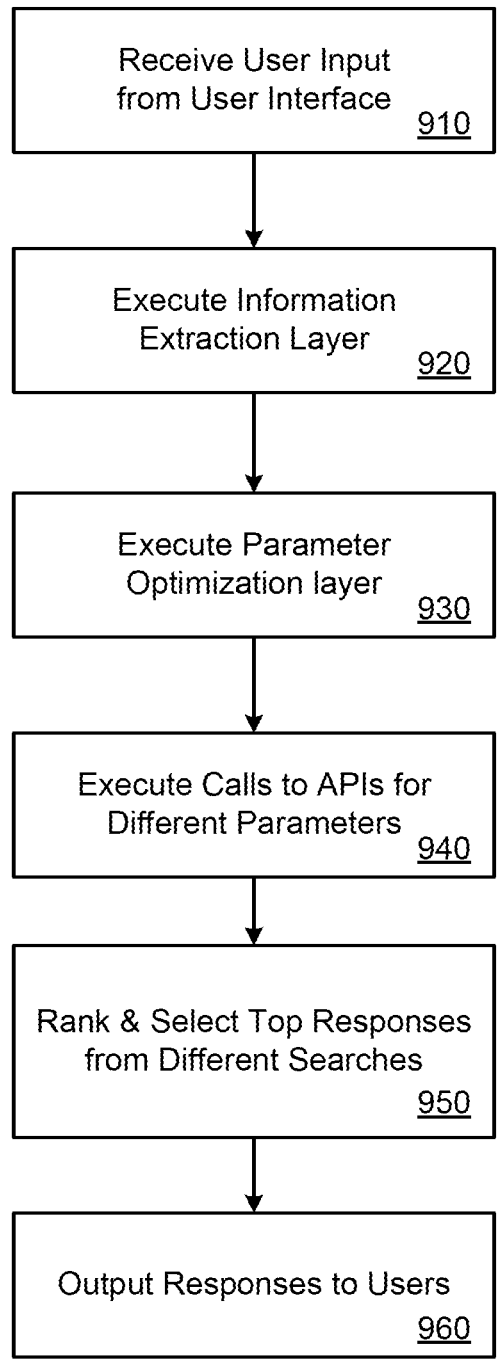
FIG. 9 depicts a method of domain-optimized search querying via data input, according to an example embodiment.

Based on the foregoing, referring now to FIG. 9, a method of providing search queries and responses using parameters optimized by machine learning is shown, according to an example embodiment. At least one of the computing system 100, the provider computing system 102, the system architecture 200, or a component thereof, can perform method 900.

At 910, user inputs are received from a user interface. For example, the interface circuit 112 can receive user inputs. For example, the information extraction processing circuit 130 can receive user inputs. For example, the client application 174 is or includes at least a portion of the user input layer. For example, the user device communication channel 180 is or includes at least a portion of the user input layer. The user input layer serves as the gateway for users to express their desired travel plans. This interactive stage awaits input from users, where they can enter queries like "Weekend trips to Alaska" and others. The collected data (e.g., collected via the client application 174) is then transmitted to the backend infrastructure (e.g., via the user device communication channel 180), undergoing processing and analysis (e.g., by the information extraction processing circuit 130). This backend processing combines machine learning algorithms, advanced natural language processing techniques, and robust ranking mechanisms to extract valuable information from the user input (e.g., by the parameter optimization circuit 140). Armed with these insights, the provider computing system 102 works tirelessly to curate and present the most valuable output offers.

At 920, an information extraction layer can be executed. For example, the information extraction processing circuit 130 executes the information extraction layer. The information extraction processing circuit 130 can include at least a portion of an information extraction layer. This information extraction layer serves as the first step in processing the input user query, and is mainly responsible for extracting meaningful information from the input query using natural language processing combined with machine learning techniques. This layer focuses on understanding the user's intent, analyzing the text input, and identifying key elements such as origin, destination, and travel dates. By leveraging the models of the ML circuits described herein, the user's non-bounded query is transformed into structured data that can be effectively processed by the provider computing system 102 for further actions and optimizations.

The information extraction processing circuit 130 can include a named entity recognition (NER) model. The NER model is configured to extract meaningful information from user queries. NER helps identify and classify named entities in the text, such as locations, dates, and more. By incorporating NER into the information extraction process, the natural language circuit 212 can relatively accurately extract relevant parameters from the user query, such as origin, destination, and travel dates. For example, consider the query "Weekend trips to Alaska from Las Vegas." NER can be applied to this query to identify the location entities "Alaska" and "Las Vegas." And with the location data storage 162, the location parameter circuit 222 can map these locations to exact airport codes. The same can be extended to dates as well.

An example flow is discussed as follows. For example, a non-bounded query of "Weekend trips to Alaska from Las Vegas" may be received, and information extraction processing circuit 130 processes this query to obtain information such as origin, destination airport code, and potential travel dates using NLP and machine learning models.

```
{
    "origin": [LAS],
    "destination": ["ANC", "FAI", "KTN", ....],
    "trip_start_date": ["06-16", "06-17", "06-23", "06-24", "06-30", "07-01", ....]
    "stay_length": [3, 4, 5, ... 10]
}
```

At 930, a parameter optimization layer can be executed. For example, the parameter optimization circuit 140 executes the parameter optimization layer. The parameter optimization layer operates as follows. Once the input query is transformed into structured format of data (e.g., JSON), the machine learning model circuit 232 shifts towards optimizing the number of combinations to query the offers, aiming for enhanced efficiency. This stage utilizes machine learning models built using historical search and booking data. The provider computing system 102 is configured to curate a refined selection of search combinations to query in the next stage. This disciplined approach optimizes the decision-making process and elevates the overall travel planning experience, ensuring efficiency, relevance, and satisfaction. Thus, the provider computing system 102 can provide answers to questions including:

"What are the top destinations in Alaska?"
"Top "trip_start_dates" to consider?"
"And what is the optimal stay length?"

A Gaussian Mixture Model (GMM) can be used to obtain the probability distribution for different travel parameters. For example, the machine learning model circuit 232 includes or executes a GMM. A GMM is a statistical model that represents the probability distribution of data as a combination of multiple Gaussian distributions by fitting a GMM to historical travel data for the parameters. The parameter optimization circuit 140 can estimate the probabilities for different values or ranges of each parameter. The top "n" values can be selected based on their probabilities, enabling more informed decision-making in the parameter optimization layer. By leveraging the location data and the time data into the GMM model, the provider computing system 102 can determine meaningful insights and estimate probability distributions for the travel parameters. This allows the parameter optimization circuit 140 to enhance the optimization process and generate targeted search combinations. An example data structure including location data and time data is as follows.

```
{
    {
        "origin": "LAS", "destination": "ANC", "trip_start_date": "06-16", "trip_end_date": "06-19", "adult": 1, "search_id": 2233
```

```
},{
    "origin": "LAS", "destination": "FAI", "trip_start_date": "06-16", "trip_end_date":
    "06-19", "adult": 1, "search_id": 2234
},{
    "origin": "LAS", "destination": "ANC", "trip_start_date": "06-23", "trip_end_date":
    "06-27", "adult": 1, "search_id": 2235
},
}
```

At 940, API calls are executed. For example, the interface circuit 112 executes the calls with a flight API as discussed herein. The calls that can be executed are not limited to a flight API. Example calls with a flight API are described as follows. For example, the remote system communication channel 182 can include at least a portion of the flight API. For example, the client application 174 can include at least a portion of the flight API. For example, the interface circuit 112 can include at least a portion of the flight API. Upon transforming the input query into various search combinations, the provider computing system 102 fetches flight offers by making calls to the flight API for each of the search combinations. The provider computing system 102 retrieves real-time and relevant information, including flight schedules, prices, and availability by directly connecting to the flight API or from one or more of the storages of the system memory 160. This integration allows the provider computing system 102 to present users with an extensive selection of up-to-date flight options, empowering them to make informed decisions and choose the best flights that align with their preferences and requirements. An example data structure including offers corresponding to travel objects is as follows.

```
{
    {"search_id": 2234, "offers": [.....]},
    {"search_id": 2235, "offers": [.....]},
    {"search_id": 2233, "offers": [.....]},
}
```

At 950, responses from different searches can be selected and ranked. For example, the parameter optimization circuit 140 ranks and selects the top responses from different searches. For example, upon retrieving the flight offers for each considered search combination, the provider computing system 102 selects the offers from the vast pool of options. This selection process may be beneficial by presenting users with only the predefined relevant and valuable offers. The provider computing system 102 utilizes a ranking model to rank the offers based on their suitability and desirability (which may be based on received user preferences or an analysis of similar users described herein). By applying this ranking methodology, the parameter optimization circuit 140 identifies and prioritizes the top "n" offers, ensuring that only the most advantageous choices are displayed within the user web interface.

At 960, responses are output to a user via one or more user interface (e.g., via the client application 174 of the user devices 103 as discussed herein). For example, the client application 174 can output one or more responses to users. Users are presented with a refined and tailored selection of travel, such as flight, options via a user interface as discussed herein, enabling them to make informed decisions and facilitating a seamless travel planning experience. Ranking models like pointwise, pairwise, listwise, and reinforcement learning can be trained and optimized to enhance the sorting and selection of offers in the automated travel search system.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

As used herein, the term "circuit" may include hardware and/or software structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud-based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the embodiments might include a general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

The implementations described herein have been described with reference to drawings. The drawings illustrate certain details of specific implementations that implement the systems, methods, and programs described herein. Describing the implementations with drawings should not be construed as imposing on the disclosure any limitations that may be present in the drawings.

It should be noted that although the diagrams herein may show a specific order and composition of method steps, it is understood that the order of these steps may differ from what is depicted. In a non-limiting example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components. As used in the specification and in the claims, the singular form of "a," "an," and "the" include plural references unless the context clearly dictates otherwise. References to "or" may be construed as inclusive so that any terms described using "or" may indicate any of a single, more than one, and all of the described terms.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A system, comprising:
   at least one processing circuit comprising at least one memory and one or more processors, the one or more processors configured to:

obtain, via a user interface, a non-bounded query relating to a travel trip, the non-bounded query excluding at least one parameter associated with the travel trip;

identify, via a first machine learning model, the at least one excluded parameter based on the non-bounded query;

identify, via a second machine learning model and from among a first set of travel results that match the non-bounded query and the at least one excluded parameter, a second set of the travel results by:

analyzing, based on search data from one or more users, a first and a second search result distribution, the first search result distribution corresponding to a first parameter associated with at least one trip of the one or more users and the second search result distribution corresponding to a second parameter associated with the at least one trip of the one or more users, wherein the first parameter is different than the second parameter and each of the first and second parameters relate to the at least one excluded parameter;

identifying a presentation threshold for each of the first search result distribution and the second search result distribution; and identifying the second set of the travel results based on values regarding the first and the second parameters satisfying the presentation thresholds for each of the first and second search result distributions; and present, via the user interface, one or more travel results of the second set of the travel results, and the presentation thresholds for each of the first and second search result distributions.

2. The system of claim 1, wherein the presentation threshold for each of the first search result distribution and the second search result distribution is a peak of popularity of each of the first parameter and the second parameter for the travel trip defined by the non-bounded query.

3. The system of claim 2, wherein the presentation threshold for each of the first search result distribution and the second search result distribution is based on input from the one or more users via one or more user devices.

4. The system of claim 1, wherein the presentation threshold for each of the first search result distribution and the second search result distribution is a maximum value of each of the first and second search result distributions.

5. The system of claim 1, wherein the one or more processors are further configured to:
identify, from among the second set, a third set of the travel results that meet a second presentation threshold; and
present, via the user interface, one or more travel results of the third set, and the second presentation threshold.

6. The system of claim 5, wherein the one or more processors are further configured to:
present, via the user interface, the second set of the travel results and the presentation threshold for each of the first search result distribution and the second search result distribution at a first portion of the user interface; and
present, via the user interface, the travel results of the third set and the second presentation threshold at a second portion of the user interface.

7. The system of claim 5, wherein the second presentation threshold is a second peak of a frequency distribution for the travel trip.

8. The system of claim 1, wherein the one or more processors are further configured to:
extract, from the non-bounded query via a natural language circuit, a first natural language text fragment of the non-bounded query.

9. The system of claim 1, wherein the one or more processors are further configured to:
transmit, via an interface circuit, a request to obtain the first set of the travel results matching the non-bounded query; and
receive, via the interface circuit, the first set of the travel results.

10. A method, comprising:
obtaining, via a user interface, a non-bounded query relating to a travel trip, the non-bounded query excluding at least one parameter associated with the travel trip;
identifying, via a first machine learning model, the at least one excluded parameter based on the non-bounded query;
identifying, via a second machine learning model and from among a first set of travel results that match the non-bounded query and the at least one excluded parameter, a second set of the travel results by:
analyzing, based on search data from one or more users, a first search result distribution corresponding to a first parameter related to the at least one excluded parameter;
identifying a presentation threshold for the first search result distribution; and
identifying the second set of the travel results based on values regarding the first parameter satisfying the presentation threshold for the first search result distribution; and
presenting, via the user interface, one or more travel results of the second set of the travel results, and the presentation threshold.

11. The method of claim 10, wherein the presentation threshold indicates a peak of popularity of the travel trip defined by the non-bounded query.

12. The method of claim 11, wherein the presentation threshold is based on input from the one or more users via one or more user devices.

13. The method of claim 10, wherein the presentation threshold is a maximum value of the first search result distribution.

14. The method of claim 10, further comprising:
identifying, from among the second set, a third set of the travel results that meet a second presentation threshold; and
presenting, via the user interface, one or more travel results of the third set, and the second presentation threshold.

15. The method of claim 14, further comprising:
presenting, via the user interface, the second set of the travel results and the presentation threshold at a first portion of the user interface; and
presenting, via the user interface, the travel results of the third set and the second presentation threshold at a second portion of the user interface.

16. The method of claim 14, wherein the second presentation threshold is a frequency distribution for the travel trip.

17. The method of claim 10, further comprising:
extracting, from the non-bounded query via a natural language circuit, a first natural language text fragment of the non-bounded query.

18. The method of claim 10, further comprising:
transmitting, via an interface circuit, a request to obtain the first set of the travel results matching the non-bounded query; and
receiving, via the interface circuit, the first set of the travel results.

19. A non-transitory computer readable medium including instructions stored therein that, when executed by one or more processors, cause the one or more processors to perform operations comprising:
obtaining, via a user interface, a non-bounded query relating to a travel trip, the non-bounded query excluding at least one parameter associated with the travel trip;
identifying, via a first machine learning model, the at least one excluded parameter based on the non-bounded query;
identifying, via a second machine learning model and from among a first set of travel results that match the non-bounded query and the at least one excluded parameter, a second set of the travel results by:
analyzing, based on search data from one or more users, a first search result distribution, the first search result distribution corresponding to a first parameter related to the at least one excluded parameter;
identifying a presentation threshold for the first search result distribution; and
identifying the second set of the travel results based on values regarding the first parameter satisfying the presentation threshold for the first search result distribution; and
presenting, via user interface, one or more travel results of the second set of the travel results, and the presentation threshold.

20. The non-transitory computer readable medium of claim 19, wherein the presentation threshold indicates a peak of popularity of the travel trip defined by the non-bounded query.

* * * * *